(12) United States Patent
Mittermaier et al.

(10) Patent No.: US 11,838,299 B2
(45) Date of Patent: Dec. 5, 2023

(54) CLOUD-BASED WEB CONTENT PROCESSING SYSTEM PROVIDING CLIENT THREAT ISOLATION AND DATA INTEGRITY

(71) Applicant: Zscaler, Inc., San Jose, CA (US)

(72) Inventors: Uli P. Mittermaier, Boston, MA (US); Alex-Marian Negrea, Bucharest (RO)

(73) Assignee: Zscaler, Inc., San Jose, CA (US)

( * ) Notice: Subject to any disclaimer, the term of this patent is extended or adjusted under 35 U.S.C. 154(b) by 237 days.

(21) Appl. No.: 16/702,889

(22) Filed: Dec. 4, 2019

(65) Prior Publication Data

US 2020/0314121 A1    Oct. 1, 2020

Related U.S. Application Data

(60) Provisional application No. 62/823,220, filed on Mar. 25, 2019.

(51) Int. Cl.
*H04L 9/40* (2022.01)
*G06F 21/53* (2013.01)

(52) U.S. Cl.
CPC .......... *H04L 63/1416* (2013.01); *G06F 21/53* (2013.01); *H04L 63/20* (2013.01)

(58) Field of Classification Search
CPC ... H04L 63/14–1491; H04L 63/20–205; G06F 21/50–568
See application file for complete search history.

(56) References Cited

U.S. PATENT DOCUMENTS

| | | | |
|---|---|---|---|
| 9,729,515 B1* | 8/2017 | Anantharaju | H04L 63/0876 |
| 9,923,926 B1* | 3/2018 | Banga | H04L 63/1425 |
| 2005/0095571 A1* | 5/2005 | Miller | G09B 7/02 434/350 |
| 2007/0260702 A1* | 11/2007 | Richardson | G06F 16/95 709/217 |
| 2011/0113467 A1* | 5/2011 | Agarwal | G06F 21/53 726/1 |
| 2016/0173617 A1* | 6/2016 | Allinson | H04L 67/148 709/227 |
| 2017/0070509 A1 | 3/2017 | Giura et al. | |
| 2017/0093835 A1* | 3/2017 | Whiteside | H04L 67/14 |
| 2017/0339563 A1 | 11/2017 | Singleton, IV | |
| 2018/0159896 A1* | 6/2018 | Soman | G06F 9/5077 |
| 2019/0075130 A1 | 3/2019 | Petry et al. | |
| 2019/0394255 A1* | 12/2019 | Kolesnikov | H04L 67/02 |
| 2020/0153818 A1* | 5/2020 | Chauhan | G06F 21/128 |

OTHER PUBLICATIONS

May 14, 2020, European Search Report issued for European Application No. EP 20 16 3660.

* cited by examiner

*Primary Examiner* — Madhuri R Herzog
(74) *Attorney, Agent, or Firm* — Baratta Law PLLC; Lawrence A. Baratta, Jr.; Ryan Odessa

(57) ABSTRACT

Systems and methods include receiving a request for resources that are one of web content and a cloud application from a user device; determining the request requires isolation based on any of policy, category of the web content, type of the user device, and location of the user device; rendering content associated with the request in a secure environment that is isolated from the user device; and providing image content based on the content to the user device. The user device can execute a web browser that loads the image content utilizing a JavaScript application and that interacts with the image content by sending keyboard and mouse inputs via a WebSocket channel.

20 Claims, 16 Drawing Sheets

CLOUD-BASED WEB CONTENT PROCESSING SYSTEM PROVIDING CLIENT THREAT ISOLATION AND DATA INTEGRITY

CROSS-REFERENCE TO RELATED APPLICATION(S)

The present disclosure claims priority to U.S. Provisional Patent Application No. 62/823,220, filed Mar. 25, 2019, and entitled "CLIENT SECURITY AND DATA INTEGRITY SYSTEM OF CLOUD-BASED WEB CONTENT PROCESSING," the contents of which are incorporated by reference herein.

FIELD OF THE DISCLOSURE

The present disclosure generally relates to cloud computing. More particularly, the present disclosure relates to cloud-based web content processing systems and methods for providing client threat isolation and data integrity.

BACKGROUND OF THE DISCLOSURE

Browser (web) isolation is a technique where a user's browser or apps are physically isolated away from the user device, the local network, etc. thereby removing the risks of malicious code, malware, cyberattacks, etc. This has shown to be an effective technique for enterprises to reduce attacks. Also, secure web gateways protect users and their user devices from infection as well as enforcing enterprise policies. For example, cloud-based secure web gateways are deployed to secure enterprise networks regardless of location. Enterprise Information Technology (IT) personnel are moving the deployment of applications to the cloud. Thus, secure enterprise applications are available to users across the Internet, across different platforms, different locations, trusted and untrusted devices, etc. The traditional demarcation points for enterprise networks are disappearing. There is a need to leverage the benefits of web isolation with secure web gateways to further secure devices, networks, and data.

BRIEF SUMMARY OF THE DISCLOSURE

In an embodiment, a method and a non-transitory computer-readable medium includes instructions that, when executed, cause one or more processors to perform the steps of receiving a request for resources that are one of web content and a cloud application from a user device; determining the request requires isolation based on any of policy, category of the web content, type of the user device, and location of the user device; rendering content associated with the request in a secure environment that is isolated from the user device; and providing image content based on the content to the user device. The user device can execute a web browser that loads the image content utilizing a JavaScript application and that interacts with the image content by sending keyboard and mouse inputs via a WebSocket channel. The resources can be the cloud application and the user device is one or more of i) located outside an enterprise's network and ii) a non-enterprise device, and the cloud application is provided in isolation to avoid data exfiltration on the user device. The determining can be performed by a secure web gateway. The instructions that, when executed, can further cause the one or more processors to perform the steps of persisting a state and session of the cloud application in the secure environment, for use after the user device logs out and logs back in. The instructions that, when executed, can further cause the one or more processors to perform the steps of receiving a second request for resources that are one of web content and a cloud application from a user device, wherein the request is a first request; and determining the second request does not require isolation, wherein the first request is rendered in isolation in a first tab of a web browser and the second request is direct, not in isolation, in a second tab of the web browser. The instructions that, when executed, can further cause the one or more processors to perform the steps of, subsequent to a logout or exiting a web browser, for the request, destroying the secure environment. The instructions that, when executed, can further cause the one or more processors to perform the steps of receiving a response to the request in the virtual browser; and converting the response to the image content.

In a further embodiment, an apparatus includes one or more processors; and memory storing instructions that, when executed, cause the one or more processors to receive a request for resources that are one of web content and a cloud application from a user device; determine the request requires isolation based on any of policy, category of the web content, type of the user device, and location of the user device; render content associated with the request in a secure environment that is isolated from the user device; and provide image content based on the content to the user device. The user device can execute a web browser that loads the image content utilizing a JavaScript application and that interacts with the image content by sending keyboard and mouse inputs via a WebSocket channel.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a user device, which may be used with the cloud-based system or the like.

DETAILED DESCRIPTION OF THE DISCLOSURE

Figure 1:
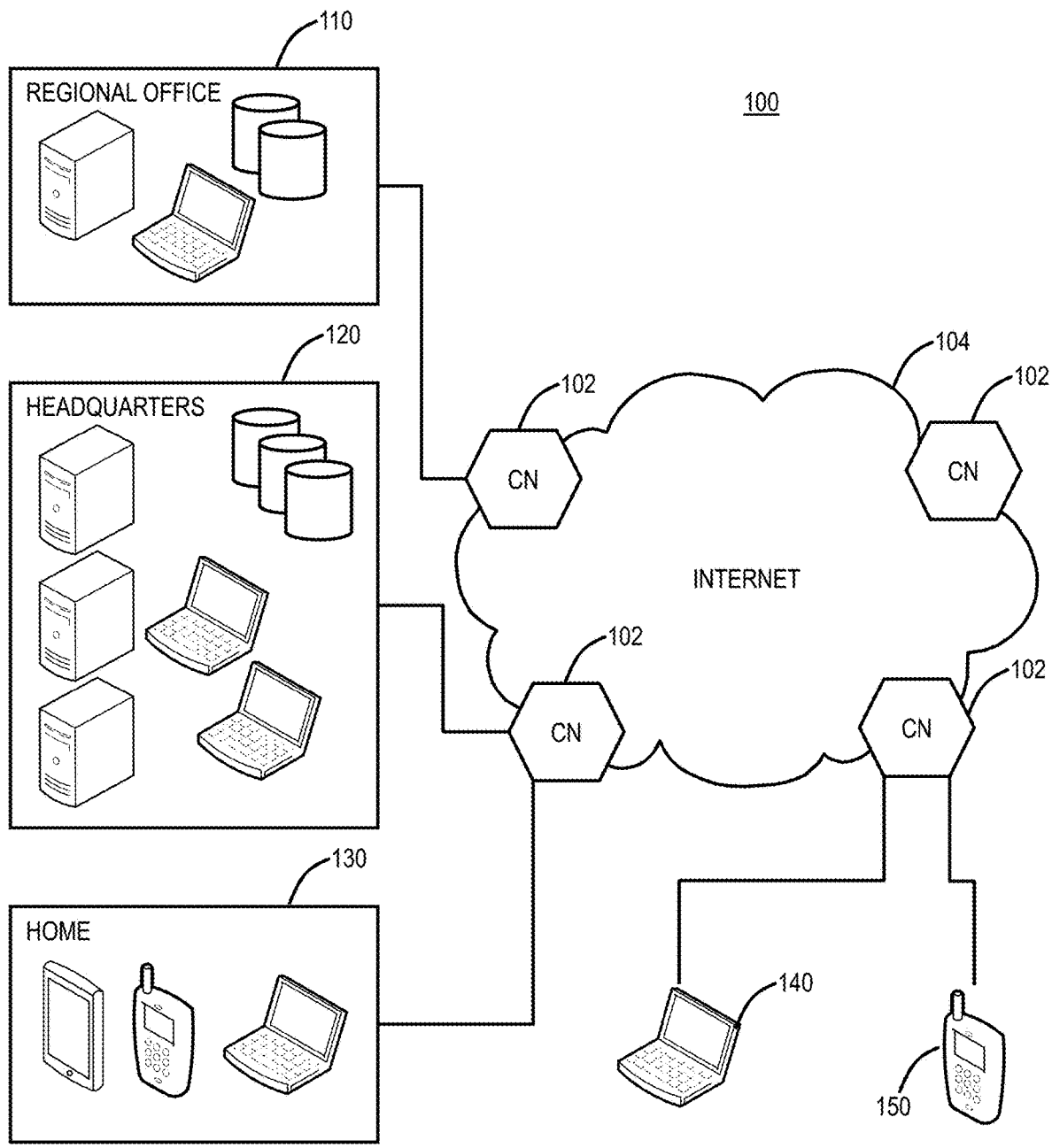
FIG. 1 is a network diagram of a cloud-based system as an example for implementing various cloud-based services.

The present disclosure relates to cloud-based web content processing systems and methods for providing client threat isolation and data integrity. The cloud-based web content processing system eliminates processing of select web content from a local web browser by moving the processing of the selected web content from a user's local web browser to a secure and isolated cloud environment, leaving only presenting images provided to the local web browser and user interface functions for interacting with the selected web content (e.g., web applications, secure data systems and the like) with the local system, i.e., web isolation. This serves two main purposes: (1) The user's local computing and network environment is not exposed to potentially malicious web content and is isolated from any threats or residual effects that may result from processing web content. (2) In the case of confidential or regulated web content, this approach prevents data exfiltration as only screen updating data is provided to the local browser. Because no data is delivered to the local system (e.g., to be processed by web content through the local web browser), none of the confidential or otherwise sensitive data can be retained on the local system. To further reduce chances that any content provided to the local web browser (e.g., as an image or graphic file to be presented and the like, that is "pixels" are presented to the local web browser or application instead of active content) can be retained without a trail, a watermark that contains an identifier of the user may be added to the screen images provided to the local web browser.

In an embodiment, the present disclosure includes a web isolation platform that secures Software-as-a-Service (SaaS) apps from data exfiltration and shields corporate endpoints from web-borne threats. It renders all content in the cloud and sends only passive, safe pixels (i.e., graphics files) to the browser to prevent exfiltration of confidential or regulated data from web apps (such as Salesforce (SFDC), Office365 (O365), or Workday) or exposure to malicious web content. IT security professionals gain peace of mind with GDPR and HIPAA compliance and visibility into end-user activity. The web isolation platform runs in the cloud, accessible from any web browser without installation.

In another embodiment, a secure, isolated cloud environment includes a request handler that receives requests for target web content, such as web sites, data, applications, and the like. The isolated cloud environment processes the targeted content/data/apps with a virtual browser engine that renders them and translates the rendered content to passive pixels that are sent to the original requesting web browser (typically an end-user local web browser) while receiving any user keyboard/mouse interactions from that browser. The redirection of requests to the secure, isolated cloud-based environment can be implemented through an additional external component. Two such examples include:

(1) A secure web gateway responds to a request from the local web browser by instructing the client (local web browser) to use a redirect to request certain links/sites/Uniform Resource Locators (URLs)/services from the isolation platform (e.g., in order to prevent malicious code from running on the client).

(2) An Identity Provider-integrated component that is part of the authentication chain for authorizing the user to access the desired application determines, based on criteria such as type of endpoint/location/Internet Protocol (IP) address of the user if a certain web application should be opened in the remote, isolated environment instead of the local browser (e.g., in order to prevent data exfiltration and the like). This component also provides a mechanism that prevents end-users from bypassing the isolation platform by accessing these links/sites directly with the local browser, therefore bypassing the isolation platform and its data exfiltration prevention features).

In an embodiment, the isolated cloud environment renders the content in an ephemeral container that is instantiated at runtime for each end-user session and dynamically adjusts its configuration according to predefined policies. An example of a policy is whether copy/pasting or upload/download between the local user system and the isolated platform is allowed. After the session, the container is destroyed, and no data is persisted (unless otherwise configured by the administrator such as to save the state for a future session). When the data is persisted, it can be encrypted for additional security.

The isolated cloud environment also has the capability to share single-sign-on sessions originated in the local browser with the isolated environment through configuring mutual trust relationship(s), therefore allowing seamless single sign-on independent of where the operation occurs (e.g., in the local web browser for some applications and in the secure isolated environment for others).

In an embodiment, the isolated cloud environment also has the capability to tag end-user browsers with a cryptographically signed cookie while they are used from inside a corporate network so that they can be detected when the user connects externally and use this fact as a configurable parameter to determine if isolation is required or not.

In another embodiment, the isolated cloud environment also has the capability to adapt its rendering engine to the capabilities of smaller devices, such as tablets or mobile phones, by acquiring the layout properties of the device and mirroring these accordingly. The isolated cloud environment can also include an administration and configuration dashboard that allows customer administrators to deploy the system in a self-service model. It also allows administrators to configure settings and policies and provides access to reporting and analytics.

Example Cloud System Architecture

Figure 2:
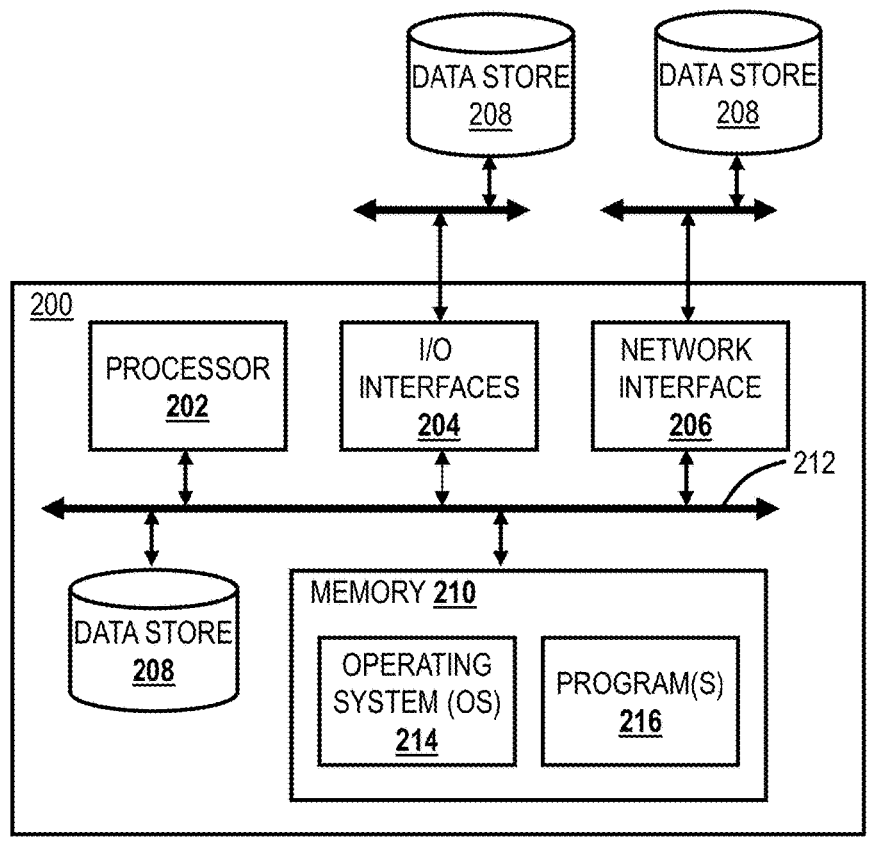
FIG. 2 is a block diagram of a server which may be used in the cloud-based system 100, in other systems, or standalone.

FIG. 1 is a network diagram of a cloud-based system 100 as an example for implementing various cloud-based services. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one or more of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, storage, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, microservice segmentation, etc. For example, the IA service can provide a user with Internet Access, and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application necessarily required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. For example, the cloud nodes 102 may be Secure Web Gateways (SWG) and the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA.

Figure 3:
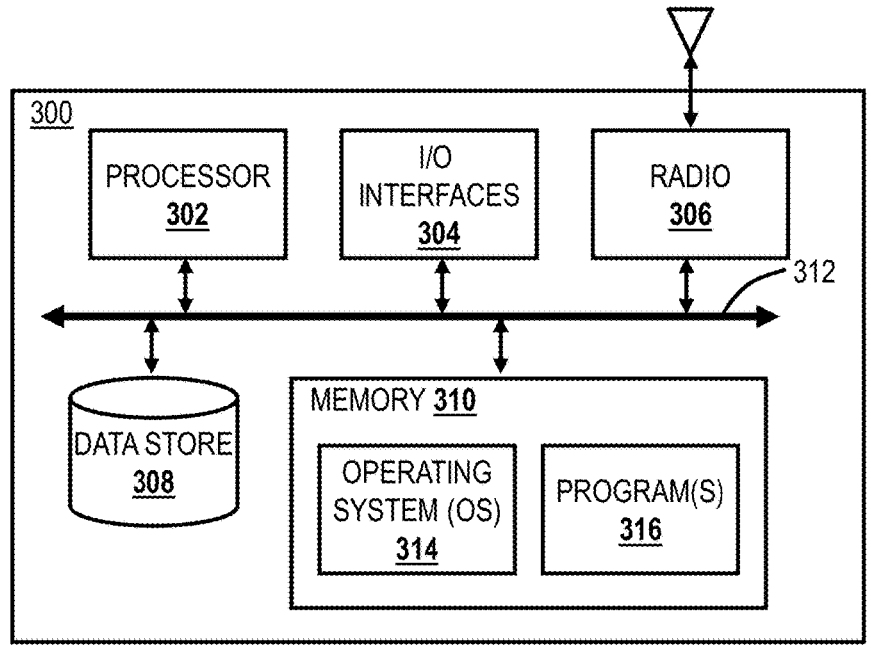

The mobile device 150 may be a user device 300 (as illustrated in FIG. 3) and may include common devices such as laptops, smartphones, tablets, netbooks, personal digital assistants, media players, cell phones, e-book readers, and the like. The cloud-based system 100 is configured to provide security and policy enforcement for devices, including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users which is dynamically available at the cloud nodes 102, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Mobile Device Architecture

FIG. 3 is a block diagram of a user device 300, which may be used with the cloud-based system 100 or the like. Again, the user device 300 can be a smartphone, a tablet, a smartwatch, an Internet of Things (IoT) device, a laptop, a media player, etc. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. The I/O interfaces 304 can include a graphical user interface (GUI) that enables a user to interact with the mobile device 310.

The radio 306 is a network interface and enables wireless communication to an external access device or network. Any number of suitable wireless data communication protocols, techniques, or methodologies can be supported by the radio 306. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Secure, Isolated Cloud Environment

Figure 4:
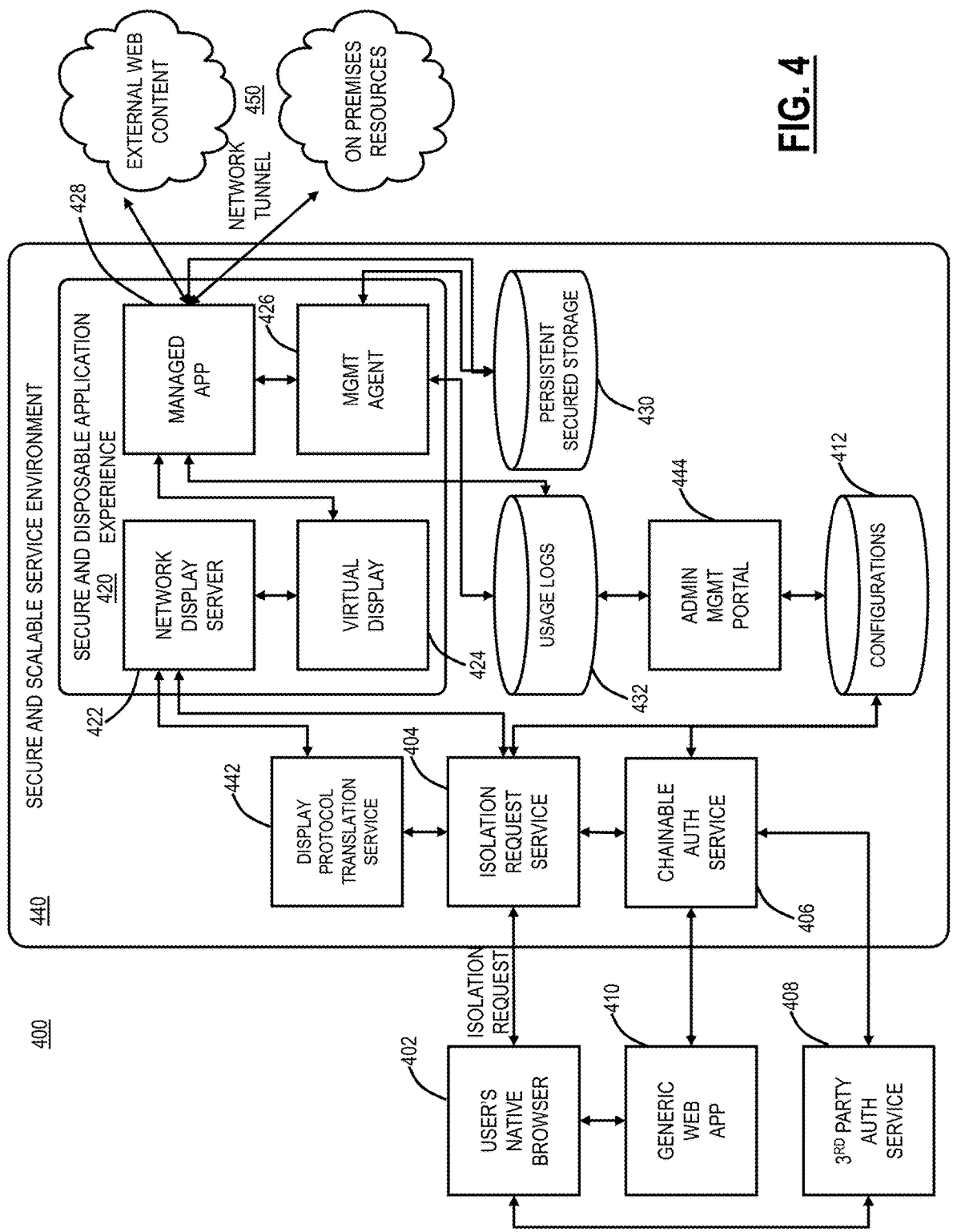
FIG. 4 is a block diagram of a secure, isolated cloud environment.

FIG. 4 is a block diagram of a secure, isolated cloud environment 400. The user device 300 includes a native browser 402 that is configured to connect, such as via WebSocket channels, to an isolation request service 404 and to display image data received from the isolation request service 404. The native browser 402 can be any standard HTML5 compliant web browser.

A chainable authentication service 406 can be instantiated into a service that can be chained and proxy the authentication to another third party authentication service 408 or can end the chain to a local user store. When this service 406 acts as a chain, it typically sits between a Web App 410 and the third party authentication service 408 and acts as a middleman by checking originating request and forwarding to an Identity Provider based on certain policies available in configuration storage 412. The chainable authentication service 406 can utilize one of the well-known authentication or federation protocols (SAML, OAUTH, OPENID, etc.) and can interact with third-party authentication service 408 that utilize similar protocols. The policies of this service sit in the configuration storage 412 and are being processed at runtime based on information embedded in the request URL.

The isolation request service 404 is an Internet-facing web service capable of processing external isolation requests by doing a series of actions: one such action can be authenticating a user by redirecting to the chainable authentication service 406, another action can be fetching Configuration policies for the user at runtime by connecting to an Application Programming Interface (API) to retrieve the policies. Policies obtained from the configuration storage 412 are used to instantiate a secure and disposable application environment 420.

A network display server 422 is a component that is capable of forwarding data coming from a virtual display 424 inside an Operating System and send it to the network in a given protocol format. It is typically a piece of software that provides connectivity to the display driver of an Operating System and lives in the user space of the Operating System. An example of such server can be the Remote Desktop Protocol (RDP) server that lives as a userspace application on top of an existing X Display in a Linux Operating System and streams the content of the display over the network.

A management agent 426 is a component that helps with managing the secure and disposable application environment 420 lifecycle and provisioning mechanisms. The management agent 426 helps provisioning and auto-configuration of a managed application 428.

The managed application 428 can be any application (web or non-web) that is able to run in a managed environment on top of an Operating System. The managed application 428 is purposely built or modified to be able to be managed through the management agent 426. The lifecycle of the application and the provisioning of configuration and policies depends on the communication with the management agent 426. The managed application 428 may or may not have access to an external network. Through a network tunnel may have access to some other internal resources. An example of such an application can be a web browser or a Secure Shell (SSH) client.

The secure and disposable application environment 420 is a transient, non-persistent, managed, and containerized application experience that contains the necessary functions to expose the actual User Interface of the managed application 428 to the outside world using the network display server 422. The secure and disposable application environment 420 is managed through the management agent 426.

A persistent secured storage 430 is secured storage system that can be used to save user settings or sessions from one session of managed application 428 to another in order to keep a managed application 428 state across user sessions.

The third-party authentication service 408 is an identity provider or authentication service capable of speaking a standardized federation or authentication protocol (such as OpenID, OAuth, SAML) that is able to securely authenticate users that it has governance over.

Usage logs 432 are logs and event data generated by the user while using the managed application 428 on within the secure and disposable application environment 420. The logs and event data pertain to the capabilities of the managed application 428 as well as to other agnostic event information such as geolocation, time and named user doing the fore mentioned event.

The configuration storage 412 is a data store exposed to the outside world through an API. The datastore persists policies that define how the chainable authentication service 406 will work and how the managed application experience will behave when a user uses it. In the configuration storage 412, security and behavioral policies are included that determine what the user will see, experience, and be restricted to do inside the secure and disposable application environment 420. An example of such a policy can be the capability of copying content from the managed application 428 to the user's native browser 402.

A secure and scalable service environment 440 can be a collection of microservices that can be deployed in cloud-based environments or completely on-premise. Typically, one such environment can be being served for each company/customer A display protocol translation service 442 is a service or server that converts from a type of display protocol provided by the network display server 422 to a browser-friendly protocol. An example of such service can be a translator from Remote Desktop Protocol to an HTML5 compatible protocol.

An admin management portal 444 is a web-based portal for administrators to manage configurations in the configurations storage 412 and view the managed application 428 usage logs and reporting.

In an embodiment, the secure and disposable application environment 420 can enable the download of files onto the user device and vice versa, based on policy/

Figure 5A:
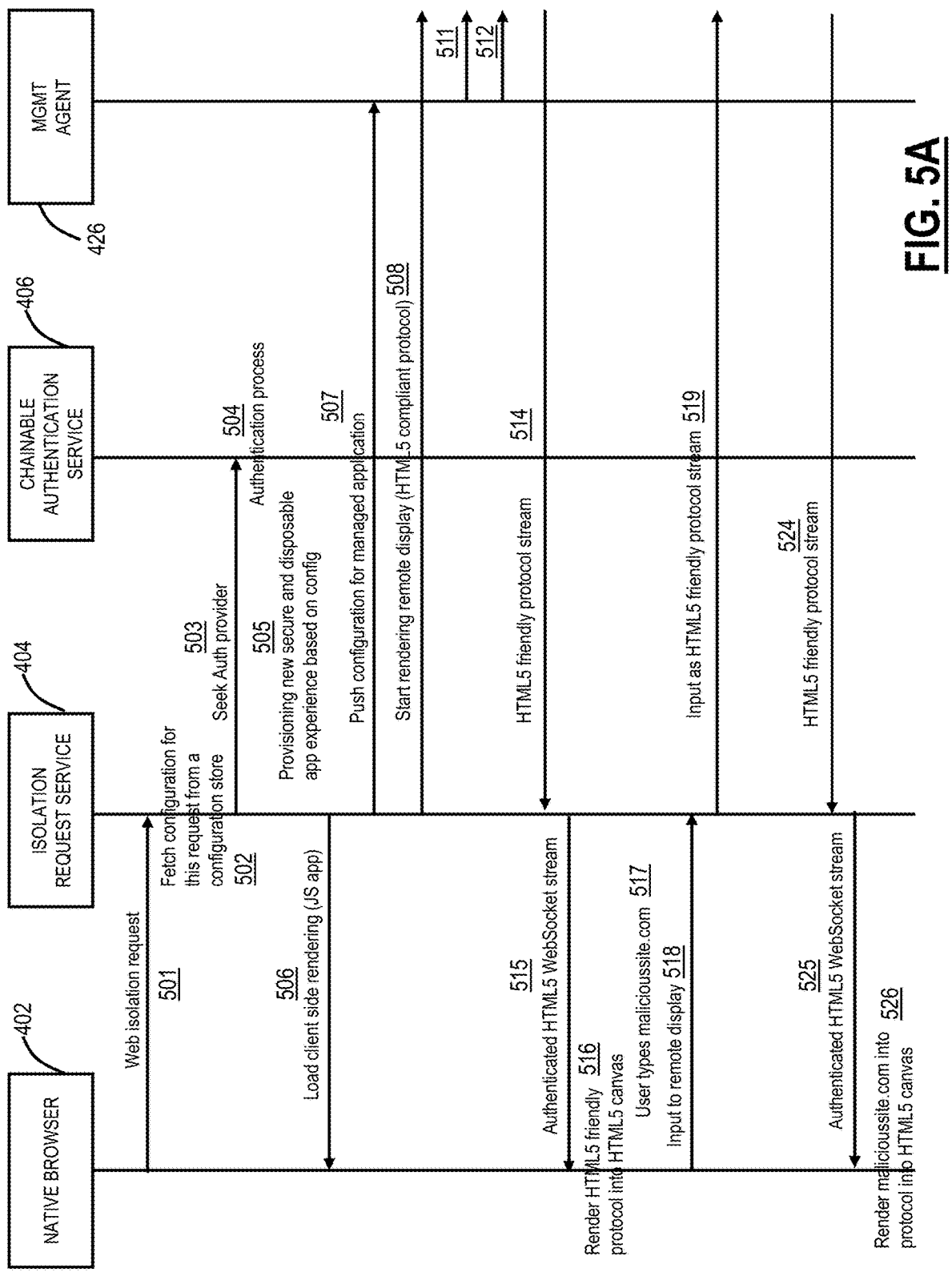
FIGS. 5A-5B are flow diagrams of an example user data persistence flow when a user accesses the secure and disposable application environment.
Figure 5B:
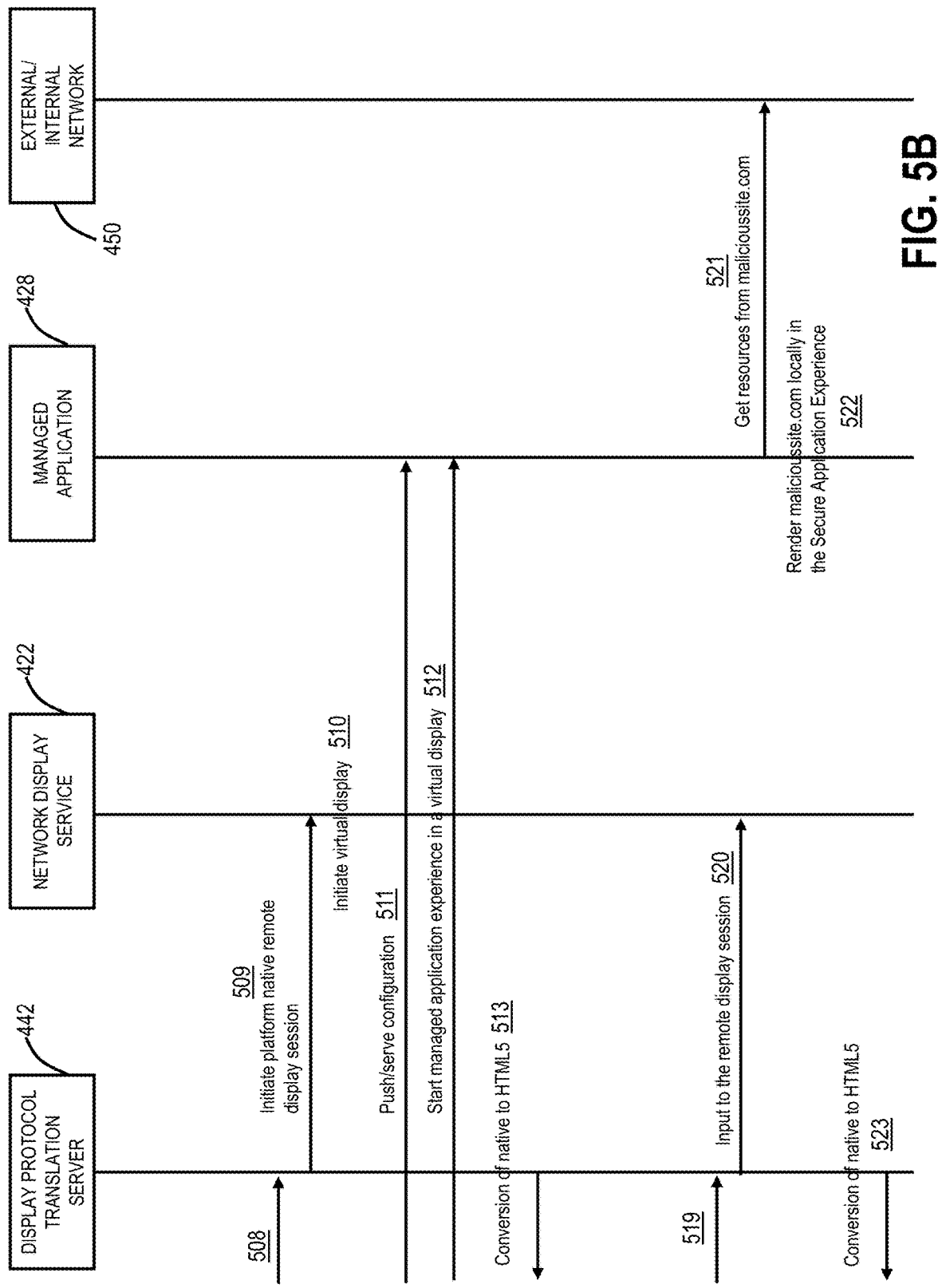

FIGS. 5A-5B are flow diagrams of an example user data persistence flow when a user accesses the secure and disposable application environment 420. This sequence flow diagram describes the process for persisting certain user and web app related information (cookies, sessions, settings, etc.) during a web isolation session. For example, once a web isolation session has already been initiated (as per the other sequence flows), and that the user, through the native browser 402, interacts with App1 which is rendered by the managed application 428 which lives inside the secure and disposable application environment 420.

The management agent 426 which sits in the secure and disposable application environment 420 alongside the managed application 428 takes a snapshot—at regular intervals or before a logout event of the user—of the cookies and session that the user has created as part of his interaction with App1 in the web isolation session inside the secure and disposable application environment 420. This snapshot is encrypted and stored into the persistent secured storage 430, available for future use when necessary.

When the user logs out, the secure and disposable application environment 420 is typically being destroyed; therefore, any existing cookies or other user-related information of browsing are being destroyed alongside.

At a later date, when the user initiates another web isolation session, by using a different secure and disposable application environment, accesses again App1. The management agent 426 restores the snapshot of the cookies and other user-related information for App1 from the persistent secured storage 430 and loads it into the secure and disposable application environment 420. As a result, the user will interact with App1 using the same cookies and settings from the previous isolation session, therefore, achieving a similar experience to that of a browser that was never closed.

Various operations are now described in an example flow in FIGS. 5A and 5B. The user operates the native browser 402 on the user device 300, and a web isolation request is sent to the isolation request service 404 (step 501). The web isolation request can be direct from the native browser 402, from an intermediate device such as one of the cloud nodes 102 as a secure web gateway, etc. The isolation request service 404 fetches a configuration for the request from the configuration storage 412 (step 502). The isolation request service 404 can seek an authentication provider (step 503) from the chainable authentication service 406, which implements an authentication process (step 504).

Once authenticated, the isolation request service 404 provisions a new secure and disposable application environment 420 (step 505) and client-side rendering is loaded on the native browser 402 (e.g., a JavaScript application) (step 506). The isolation request service 404 pushes a configuration for the managed application 428 to the management agent 426 (step 507). The isolation request service 404 starts rendering a remote display (such as via an HTML5 compliant protocol) with a display protocol translation server 442 (step 508). The display protocol translation server 442 initiates a platform-native remote display session with the network display server 422 (step 509) which initiates a virtual display (step 510).

The management agent 426 pushes/serves a configuration to the managed application 428 (step 511). The management agent 426 starts a managed application experience in a virtual display (step 512). The display protocol translation server 442 performs conversion of native protocols to HTML5 (step 513) and sends an HTML5 friendly protocol stream to the isolation request service 404 (step 514). The isolation request service 404 provides an authenticated HTML5 WebSocket stream to the native browser 402 (step 515).

At the native browser 402, the HTML5 WebSocket stream is rendered as an HTML5 friendly protocol into an HTML5 canvas (step 516). The user types or navigates to malicious-site.com (step 517), and this is input to the remote display at the isolation request service 404 (step 518). The isolation request service 404 inputs this as an HTML5 friendly protocol stream to the display protocol translation server 442 (step 519) which inputs this to the remote display session at the network display service 422 (step 520).

The managed application 428 gets the resources from malicioussite.com (step 521) and renders the malicioussite.com locally in the secure and disposable application environment 420 (step 522). The display protocol translation server 442 takes the rendered malicioussite.com and converts native to HTML5 (step 523) for an HTML5 friendly protocol stream to the isolation request service 404 (step 524). The isolation request service 404 provides the HTML5 friendly protocol stream as an authenticated HTML5 WebSocket stream to the native browser 402 (step 525). The native browser 402 renders the malicioussite.com into an HTML5 canvas (step 526).

Web Isolation Integration with a Secure Web Gateway

Figure 6:
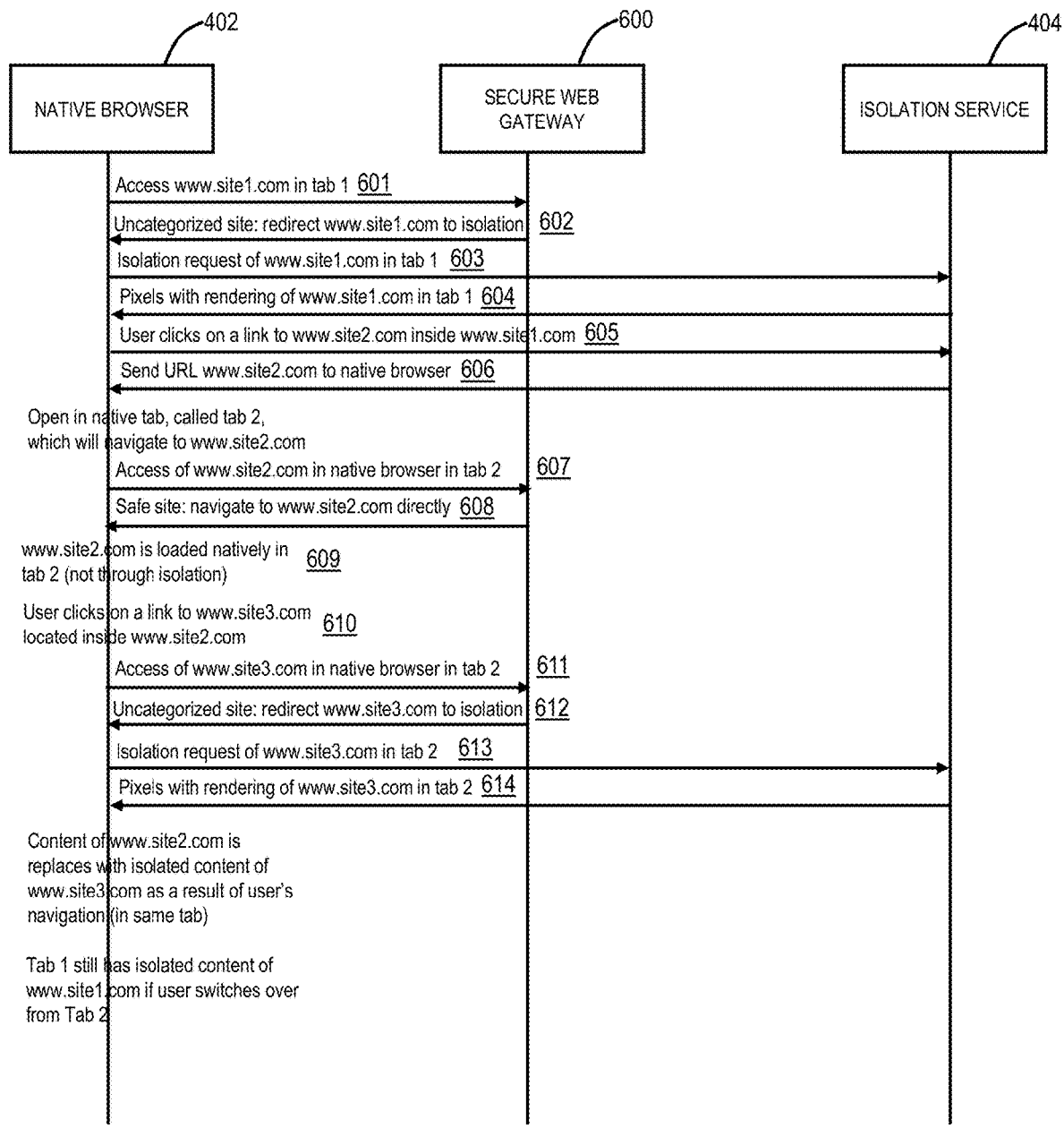
FIG. 6 is a flow diagram of an example of native browser integration with web isolation and a secure web gateway.

FIG. 6 is a flow diagram of an example of native browser integration with web isolation and a secure web gateway 600. This sequence flow diagram describes the user experience of a user with the native browser 402 that hits the isolation request service 404 as a result of his traffic being configured to go through the secure web gateway 600. The secure web gateway 600 can be an intelligent proxy that may or may not perform Secure Sockets Layer (SSL) inspection and that works at Layer 7 (e.g., a Hypertext Transfer Protocol (HTTP) proxy, Domain Name System (DNS) proxy, etc.). For example, the secure web gateway 600 can be one of the cloud nodes 102. The secure web gateway 600 can be configured for redirection to the isolation request service 404 for certain uncategorized sites, e.g., site and site3.com in FIG. 6.

The flow in FIG. 6 starts when a user accesses site1.com in the native browser 402 such as in a regular browser tab (step 601). After the evaluation by the secure web gateway 600, it is decided that site1.com should be rendered in isolation and the user is redirected transparently to the isolation request service 404 (step 602) and the native browser 402 sends an isolation request of site1.com in tab 1 (step 603). The isolation request service 404 then renders an isolated version of site1.com in user's native tab (step 604). As described herein, the isolation request service 404 sends safe pixels (i.e., graphics) to the native browser 402, instead of any code associated with site1.com.

The user is now in isolation and can interact with site1.com (i.e., the safe pixels). The user clicks on site2.com, which is a link inside site1.com (step 605). When the user clicks on site2.com, the managed application 428 evaluates that it needs to open a new tab, so the URL is sent from the isolation request service 404 stacks back to the native browser 402 (step 606).

The native browser 402 will open the URL in a new tab, and the request will be re-evaluated by the secure web gateway 600 (step 607). The secure web gateway 600 decides that site2.com is safe and can be rendered directly in the native browser 402 without isolation (step 608). At this point in time, the user has 2 tabs open, the first tab with site1.com rendered in isolation and second tab with site2.com rendered directly in the native browser 402 (step 609).

The user continues by clicking on a link to site3.com, which is located in site2.com (step 610). The native browser 402 computes that this URL does not require opening a new tab, so it tries to navigate directly to it (step 611). Being under the incidence of the secure web gateway 600, the native browser 402 is redirected (step 612) to an isolation request service 404 since site3.com is an uncategorized site (step 613). The content of site2.com now is replaced by the content of site3.com in isolation (step 614).

Application Gating

Figure 7:
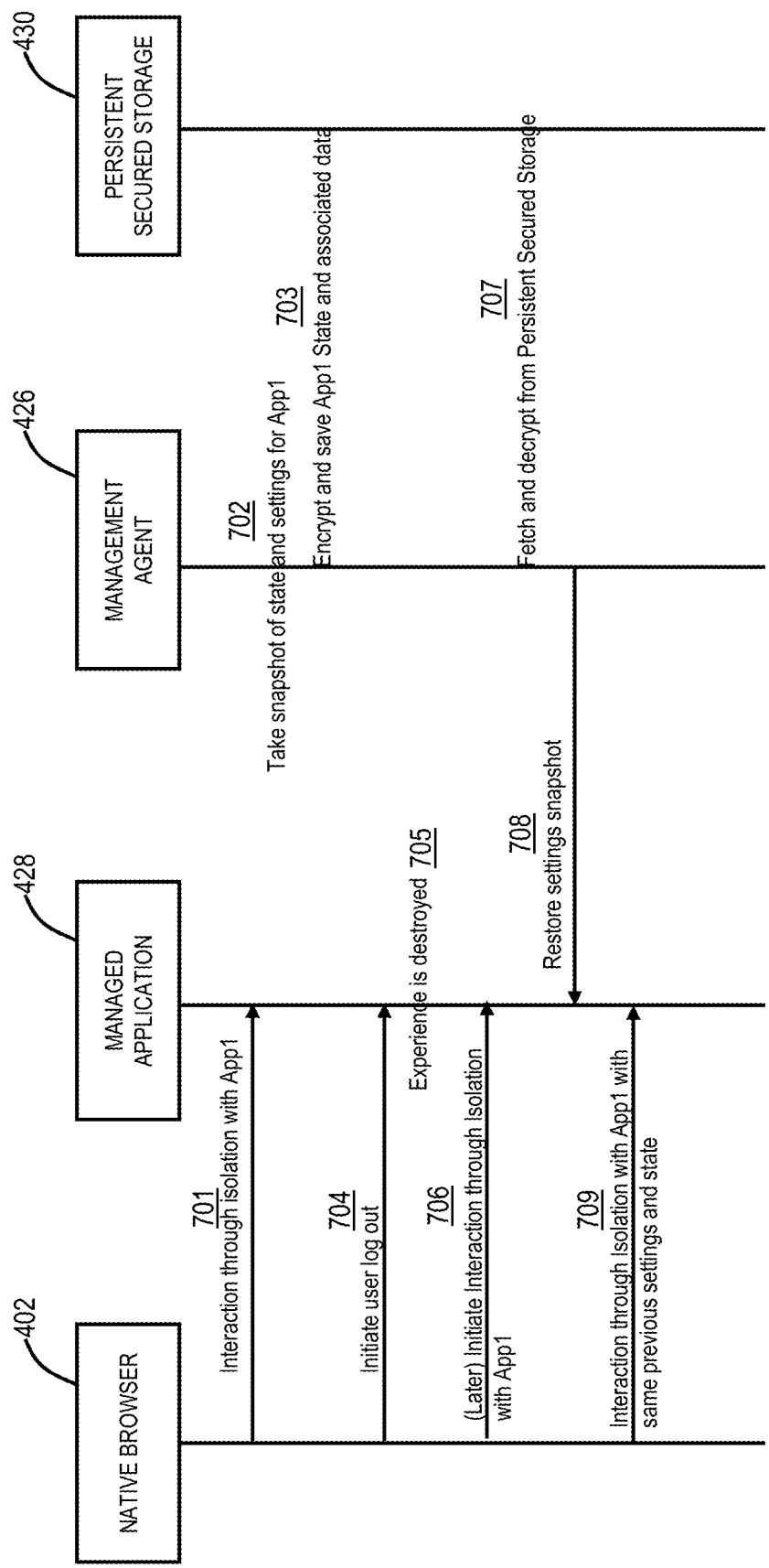
FIG. 7 is a flow diagram of application gating via the secure and disposable application environment.

FIG. 7 is a flow diagram of application gating via the secure and disposable application environment 420. In addition to rendering uncategorized or malicious content in isolation, the secure and disposable application environment 420 can be used for "application gating" where applications are presented in isolation, such as to untrusted user device, in order to protect against data exfiltration. This allows users to access sensitive content, but the content remains off the untrusted device, i.e., it is rendered graphically in the secure and disposable application environment 420 and destroyed once the session ends. FIG. 7 is a sequence flow diagram of a web application that is gated for access from unmanaged, untrusted devices.

The flow starts when the user accesses a generic web application ("App1") such as from the native browser 402 (step 701). As described herein, the generic web application can include Office 365, Salesforce, Google Suite, Box, Dropbox, Workday, etc. Another way of accessing the generic web application can be from a Single Sign-On (SSO) application portal, which also acts as an Identity Provider (IdP). The generic web application can be configured to redirect to the chainable authentication service 406 by the administrator to detect and gate applications in unmanaged endpoints. The chainable authentication service 406 is configured to check policies for gating and federate authentication requests to the original third-party IdP of the user. After the user is redirected to his third party IdP for authentication, the chainable authentication service 406 will check policies to see if this application needs to be gated or not. A policy represents a certain criteria that the user's endpoint (i.e., the native browser 402) needs to meet in order for gating to happen or not. An example of such criteria can be originating IP Address, e.g., the user is remote. Other criteria are also contemplated.

Gating web applications in this context means stopping the authentication flow and completing the final part of it in a web isolation environment; the user's native browser 402 receives a redirect from the chainable authentication service 406 to the isolation request service 404 with context needed to complete the authentication instead of completing the authentication flow to generic web application in the native browser 402. The users' native browser 402 creates a web isolation session by connecting to the isolation request service 404.

For example, with app gating, there is a capability to tag/detect endpoint and transparently redirect SaaS apps to isolation using a Security Assertion Markup Language (SAML) proxy.

When the generic web application is gated, access is permitted only through web isolation. The isolation request service 404 will push the URL of the generic web application to the management agent 426 which in turn uses it to open the generic web application inside the secure and disposable application environment 420 (step 702). The managed application 428 will now open the generic web application and will render it in isolation. The user will browse the generic web application experience inside isolation thus any content will remain contained in the secure and disposable application environment 420. During operation, the management agent 426 can periodically encrypt and save the App1 state and associated data in the persistent secured storage 430 (step 703).

At some point, the user can initiate a log out of the App1 (step 704). As described herein, the secure and disposable application environment 420 is destroyed (step 705). Assume, for example, the user later logs back into the App1 session (step 706). The App1 state and associated data can be fetched and decrypted from the persistent secured storage 430 (step 707) and the management agent 426 can restore the App1 state-based thereon (step 708). Now, the user can interact with the App1 in isolation with the same previous settings and state (step 709).

In another embodiment, assume the native browser 402 does meet the policies enforced by the chainable authentication service 406 thus the generic web application will not need gating and access to it can be direct without going through isolation. In this scenario, it is being considered that the native browser 402 is accessing from a trusted, managed endpoint. An example of such a case would be when the user is accessing from a company's corporate network. In this particular case, the policy could be configured to enforce tagging of the endpoint such as that, the chainable authentication service 406 will generate a cryptographically secure cookie that will be sent to the user's native browser 402 as part of the responses and will be used as a tagging mechanism to recognize this particular browser in the following future interactions with the chainable authentication service 406. If the policy is configured so, it could allow accesses to generic web application directly, not through isolation, if the tag (cookie) is present in the request as a mechanism of validation.

Example Web Isolation Session

Figure 8:
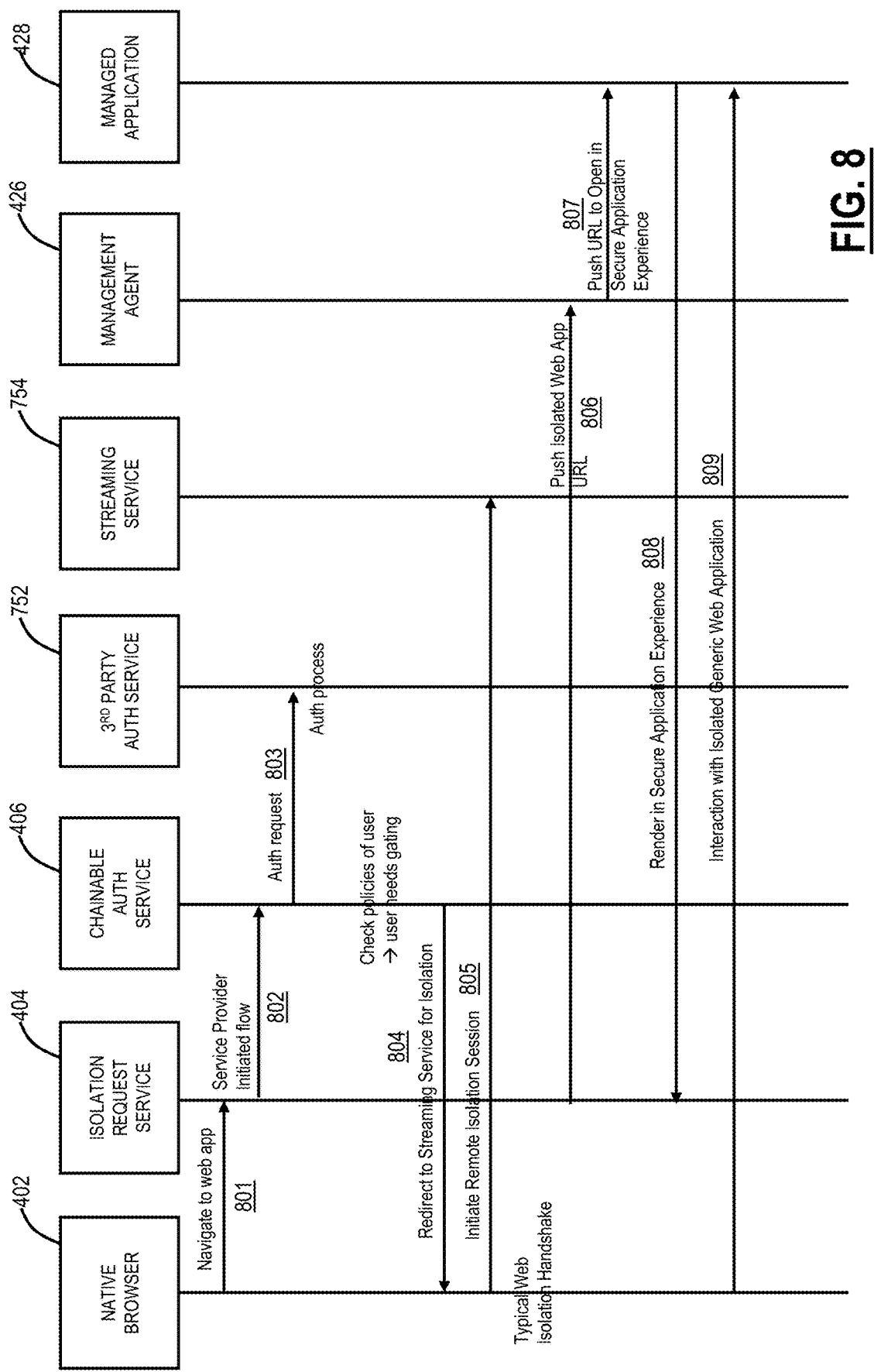
FIG. 8 is a flow diagram of a typical web isolation session for illustration purposes.

FIG. 8 is a flow diagram of a typical web isolation session for illustration purposes. FIG. 8 describes the entities and interaction between them that are used in the process of establishing a web isolation session from the native browser 402. The web isolation session is an application session where one can render the content of any managed application 428 and stream back only pixels to the native browser 402.

In the example of FIG. 8, it is assumed the managed application 428 is a web browser. The flow starts from the native browser 402 when an isolation request is being sent to the isolation request service 404 (step 801). The isolation request can be sent in multiple ways: either directly if the user wants to access the isolation request service 404 directly or indirectly through a redirect coming from a third party service that was configured for isolation. The third-party web service can be, for example, the secure web gateway 600 service that listens for web requests and redirects to the isolation request service 404 for the URLs that are uncategorized or potentially malicious. Another possibility is that an authentication service (such as the chainable authentication service 406) is configured based on certain policies to redirect to the isolation request service 404 (step 802). The isolation request service 404 will fetch the configuration for this isolation request from a configuration storage 412 based on certain attributes from the URL of the isolation request.

After fetching the configuration, it will seek the authentication provider needed to validate the user's credentials to access the isolation request service 404. Usually, this authentication provider is the chainable authentication service 406, which based on the configuration for this isolation request, will redirect to the proper third party authentication service 752 and complete the authentication process for the user by using one or more consequent web requests based on the authentication protocol chosen (step 803). After the user's credentials have been validated a new secure and disposable application environment 420 will be allocated to the end-user by the isolation request service 404 (steps 804, 805).

In the same time, a client-side renderer (a JS-based application) will be served to the native browser 402 which will be in a wait state, waiting for the secure and disposable application environment 420 to be initialized and fully provisioned. The isolation request service 404 will push the configuration for this isolation session to the management agent 426 (step 806), which pushes the URL to the secure and disposable application environment 420 (step 807).

Simultaneously (or right after) the isolation request service 404 will start a rendering session using an underlying HTML5 compatible protocol by connecting to the display protocol translation server 442 (step 808) which in turn will initiate a platform-native display session to the network display server 422 residing in the secure and disposable application environment 420. The display protocol translation server 442 serves as a translator service between native display protocol (such as Remote Desktop Protocol (RDP), for example) and an HTML5 compatible protocol. The network display server 422 acts as a local bridge between the native virtual display 424 and the network by translating raw data from the display driver to a network streamable protocol stream.

Using the Configuration received from the isolation request service 404, the management agent 426 will now push/present this information to the managed application 428 residing in the secure and disposable application environment 420 and will instruct the managed application 428 to start within a virtual display 424. Simultaneously with this start of the managed application 428, a data stream will now be exposed to the network from the virtual display 424 (on which the managed application 428 is connected to) through the network display server 422 and will be in turn transformed by the display protocol translation server 442 into an HTML5 compatible protocol. The stream reaches back to the isolation request service 404 which instructs the native browser 402 via the JS application to render the HTML5 compatible protocol into native HTML5 compatible components such as a canvas, using images of various types such as JPG, PNG, or WEBP depending on various factors such as network, frame rate, type of content in the screen etc. The communication for the rendering and streaming between the native browser 402 and the isolation request service 404 is now being done over an authenticated HTML5 WebSocket.

The end user via the native browser 402 has now established a web isolation service which streams back pixels from the managed application 428. All the clipboard, keys and mouse operation are now being transported via the WebSocket stream through an HTML5 compatible protocol and in turn into a native display protocol stream to the remote display session (step 809). The reverse of the translation happens when the communication is being done from the native browser 402 to the managed application 428.

As the user types inside the web isolation session the URL of a potentially malicious website, the website will be rendered inside the remote web isolation session by the managed application 428 independent of the native browser 402. Moreover, via the mechanisms of remote display translations mentioned above the actual representation of the remote virtual display will reach the end user native browser 402 in the form of an HTML5 compatible stream of pixels.

Web Isolation Use Cases

Figure 9:
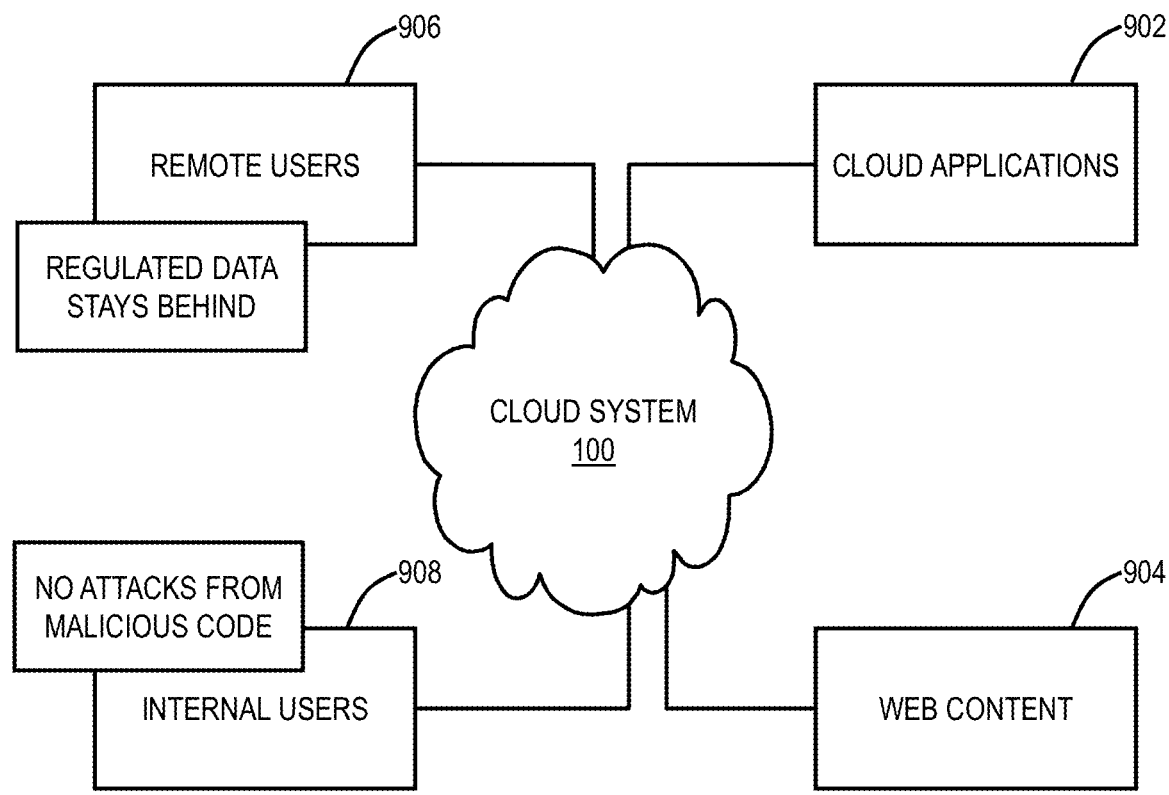
FIG. 9 is a diagram of web isolation use cases via the cloud system for cloud applications and web content.
Figure 10:
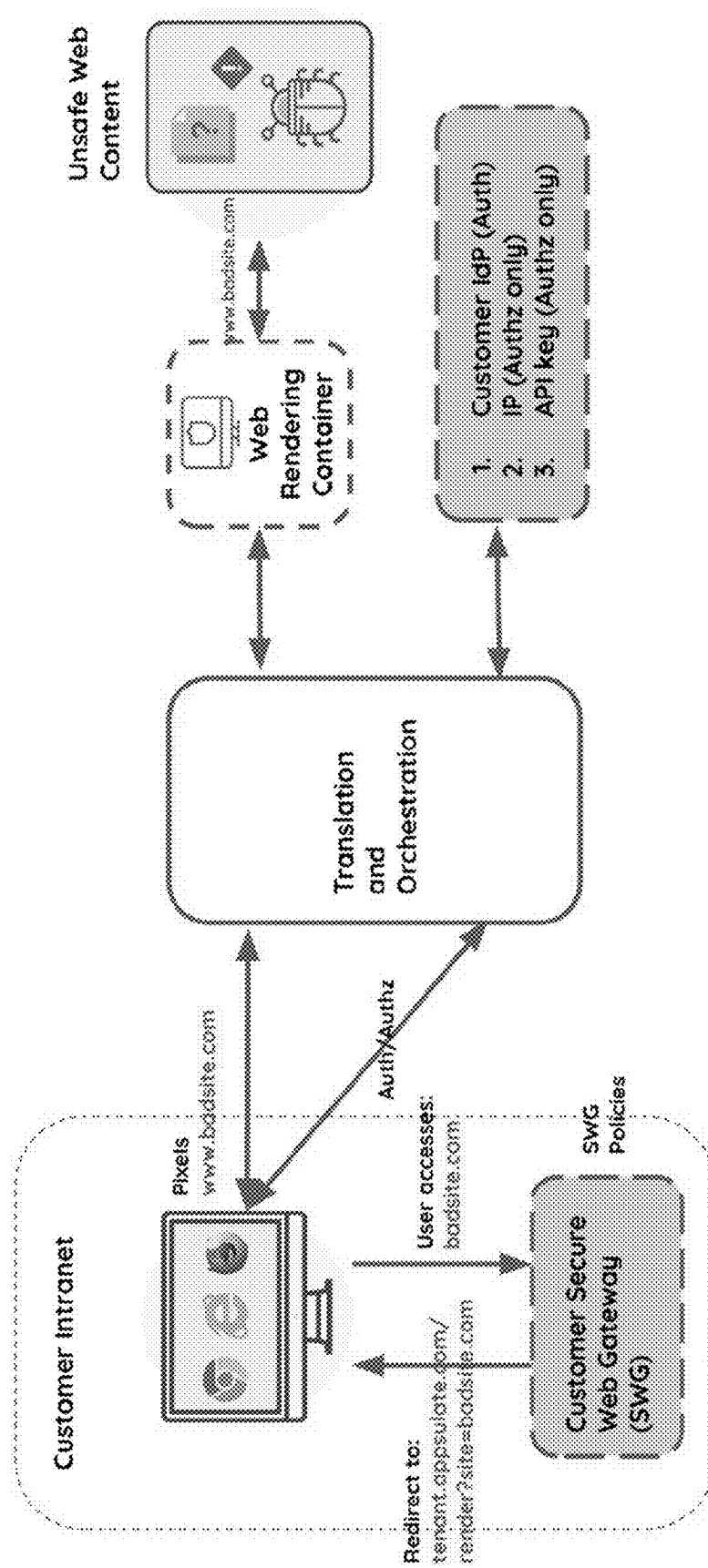
FIG. 10 is a flow diagram of web isolation.
Figure 11:
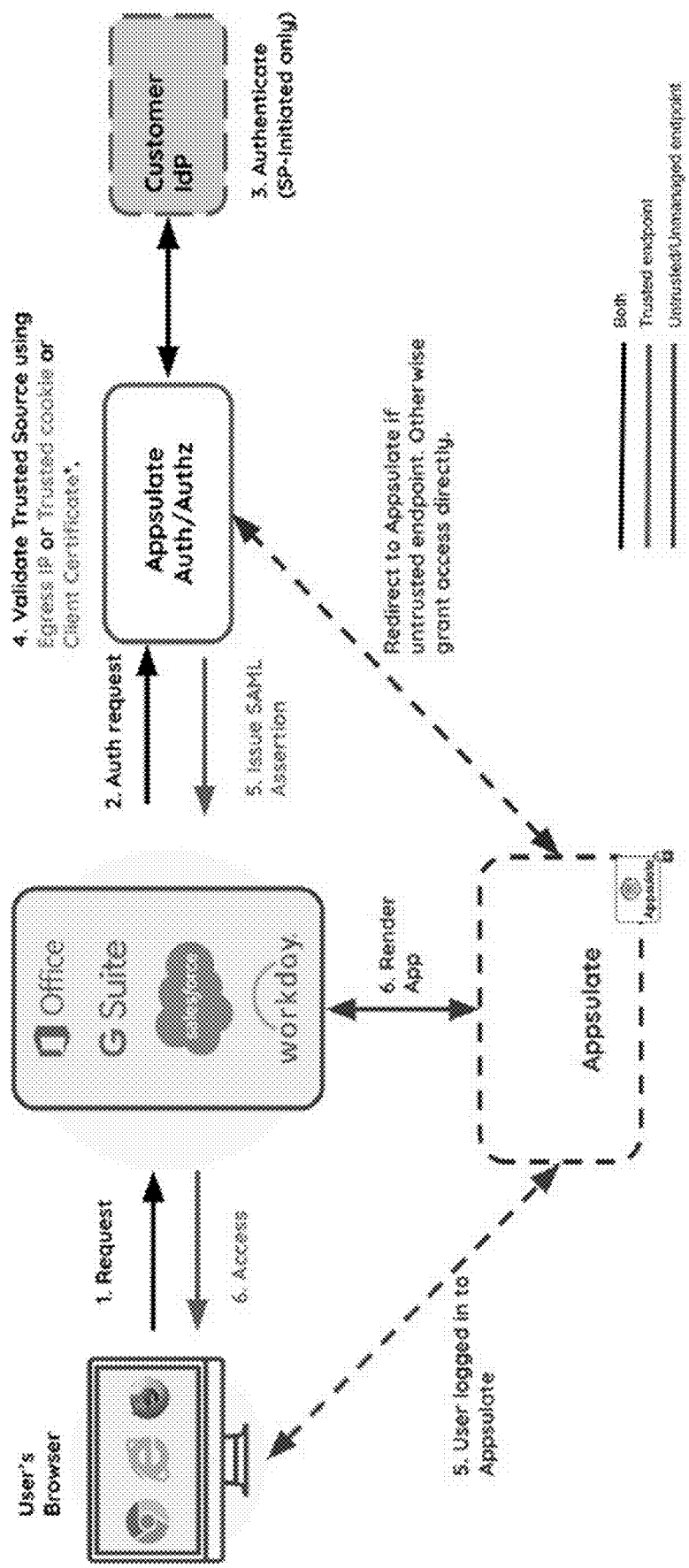
FIG. 11 is a flow diagram of application gating.

FIG. 9 is a diagram of web isolation use cases via the cloud system 100 for cloud applications 902 and web content 904. FIG. 10 is a flow diagram of web isolation and FIG. 11 is a flow diagram of application gating. In an embodiment, the secure, isolated cloud environment 400 and the secure and disposable application environment 420 can be implemented via the cloud system 100 to service remote users 906 and internal users 908. As described herein, the remote users 906 can be outside an enterprise's network, such as authorized users (employees, contractors, partners, etc.) working at home, on the road, working remote, etc. The remote users 906 can be determined via the cloud system 100 such as via IP address or other location determination techniques. The remote users 906 can be using non-authorized equipment as well, such as Bring Your Own Device (BYOD). The internal users 908 can be located inside an enterprise's network and/or with authorized enterprise hardware.

The cloud system 100 can be configured to perform the web isolation techniques described herein for both the cloud applications 902 and the web content 904. The web isolation techniques can be as described herein with respect to the secure, isolated cloud environment 400 and the secure and disposable application environment 420. For example, the cloud system 100 can perform isolation for cloud applications ("app gating") for the remote users 906 to ensure no regulated or otherwise confidential data is uncontrolled. The cloud system 100 can perform isolation for the web content for both the remote users 906 and the internal users 908 to protect from attacks due to malicious code.

The cloud system 100 can select isolation for the app gating of the cloud applications 902 based on location, device type, etc. or other policy considerations. The cloud system 100 can further select isolation for the web content 904 based on whether a particular site (URL) is uncategorized or previously categorized as malicious.

Secure Web Gateway Use Case

Figure 12A:
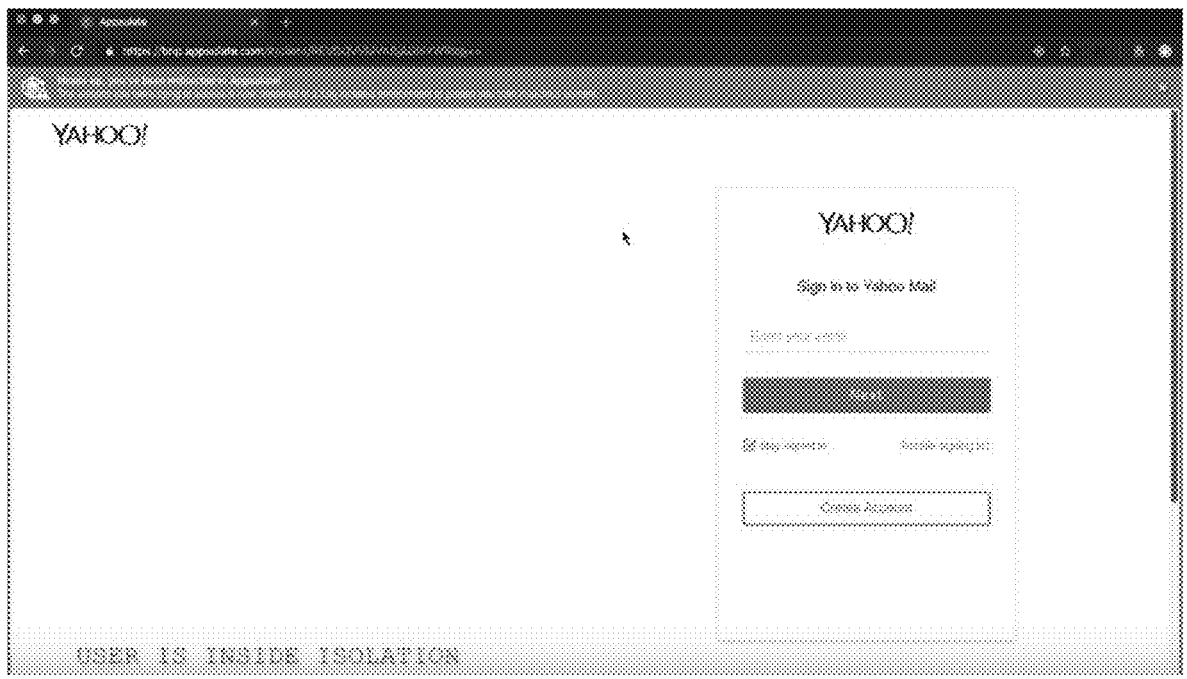
FIGS. 12A-12H are screenshots of an example of web isolation through a secure web gateway.

FIGS. 12A-12H are screenshots of an example of web isolation through a secure web gateway 600. The screenshots in FIGS. 12A-12H are those of the native browser 402. In this example, an employee is on an authorized device which may or may not be on the enterprise network. In FIG. 12A, the user opens the native browser 402 with a tab directed to access personal email, e.g., mail.yahoo.com. The secure web gateway 600 redirects traffic to isolation, such as due to policy, e.g., accessing personal email while at work. Other policies may include accessing social media, file shares, etc. while at work. In FIG. 12A, the native browser 402 appears normal to the user except for a banner notifying the user of isolation. The banner can be removed/minimized.

Figure 12B:
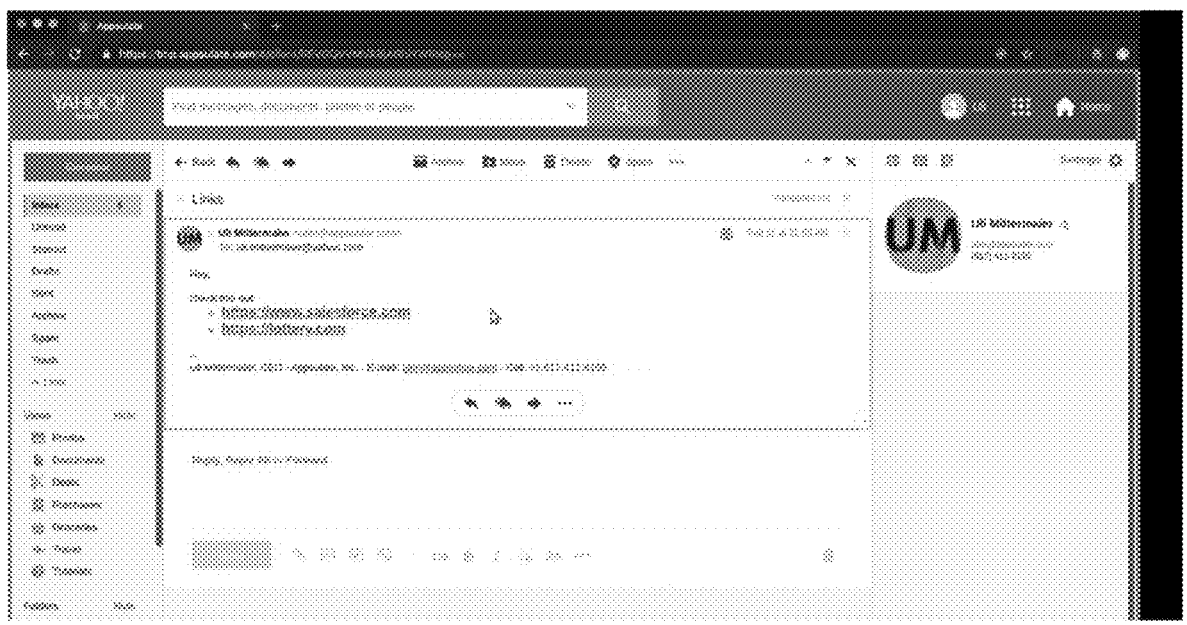

In FIG. 12B, the user accesses an email that has two links. Note, the user is able to interact with this webpage in the tab even though it is just graphics (pixels), where the native browser 402 utilizes WebSocket. The user can click on the link for www.salesforce.com in FIG. 12B. Note, in this example, www.salesforce.com is categorized as a safe location while at work, and this URL is accessed through the native browser 402 without isolation. Specifically, in FIGS. 12C and 12D, www.salesforce.com is opened in a second tab that is not isolated.

Figure 12C:
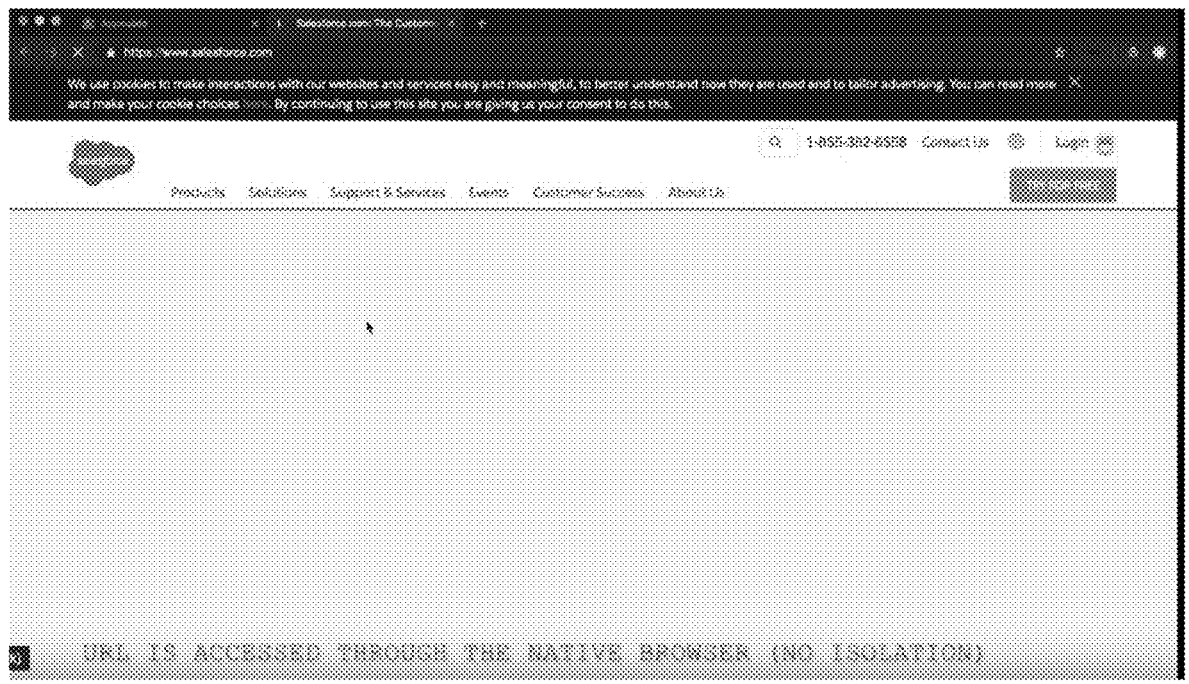
Figure 12D:
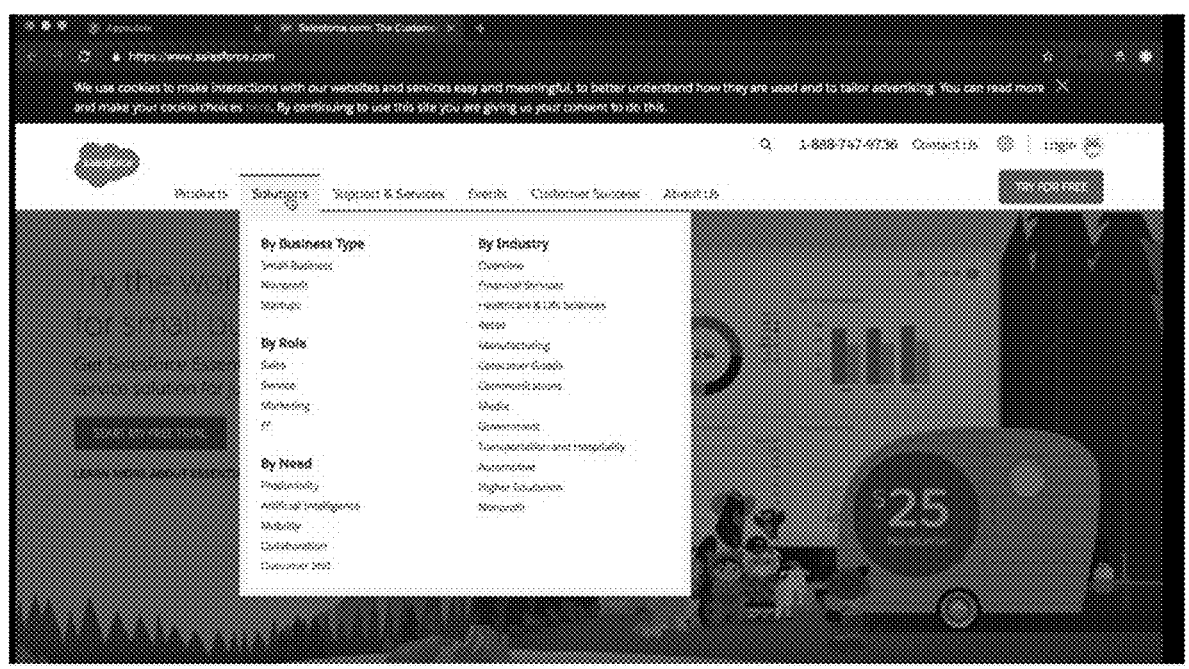
Figure 12E:
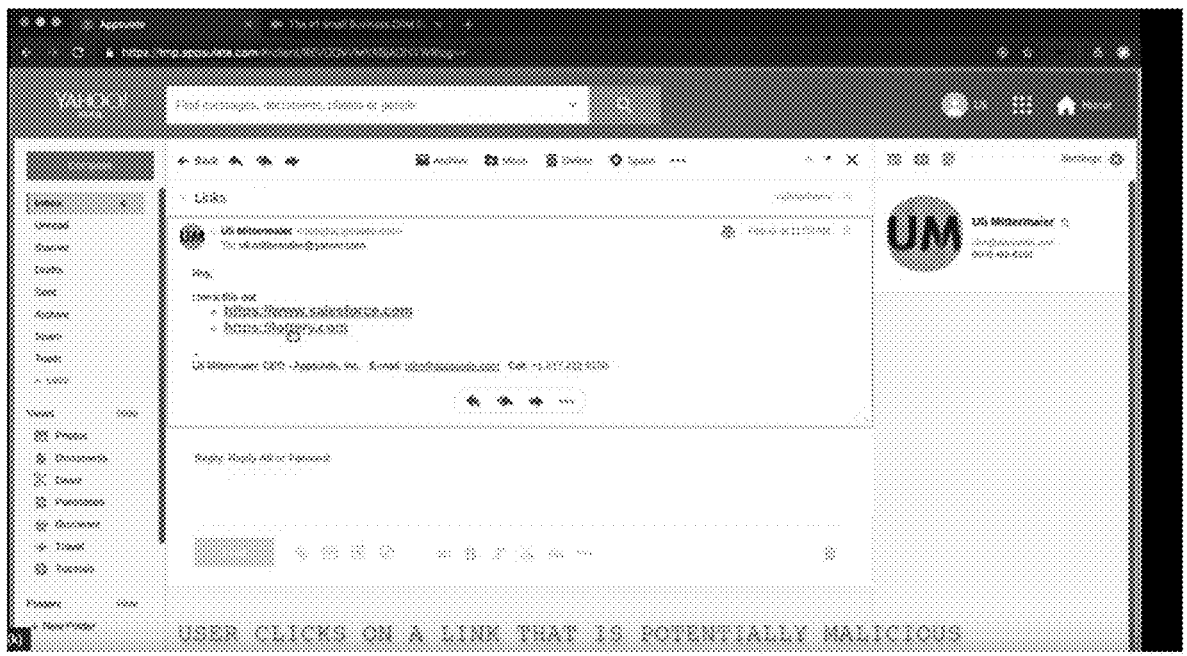
Figure 12F:
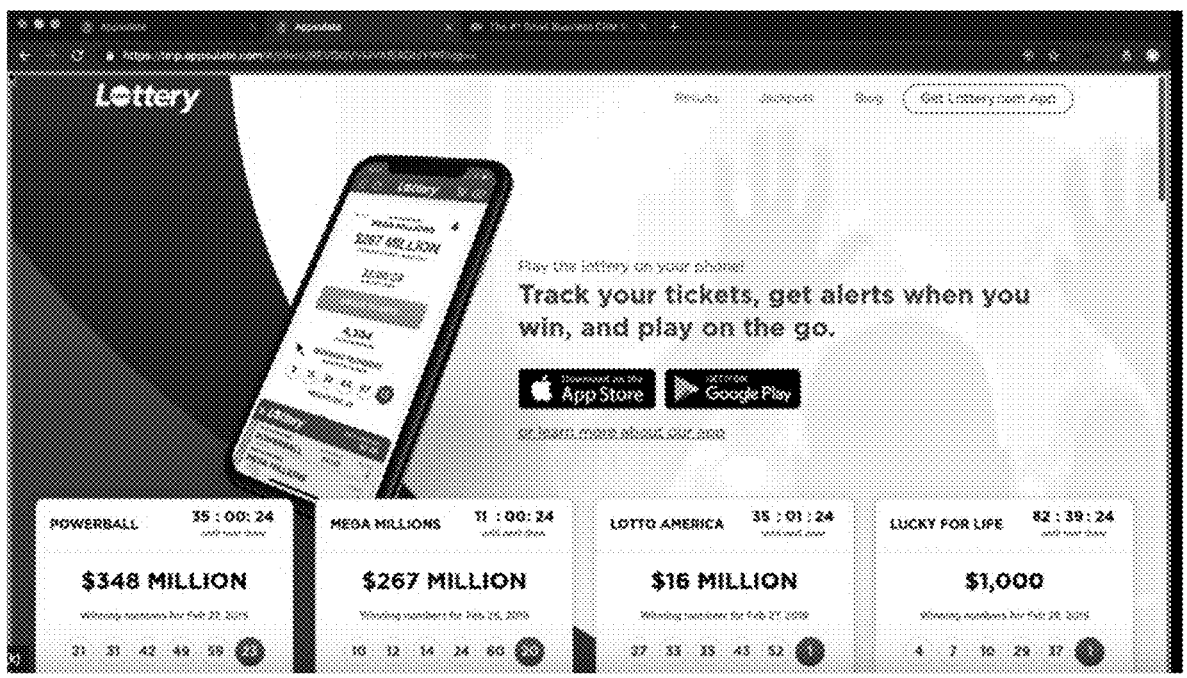
Figure 12G:
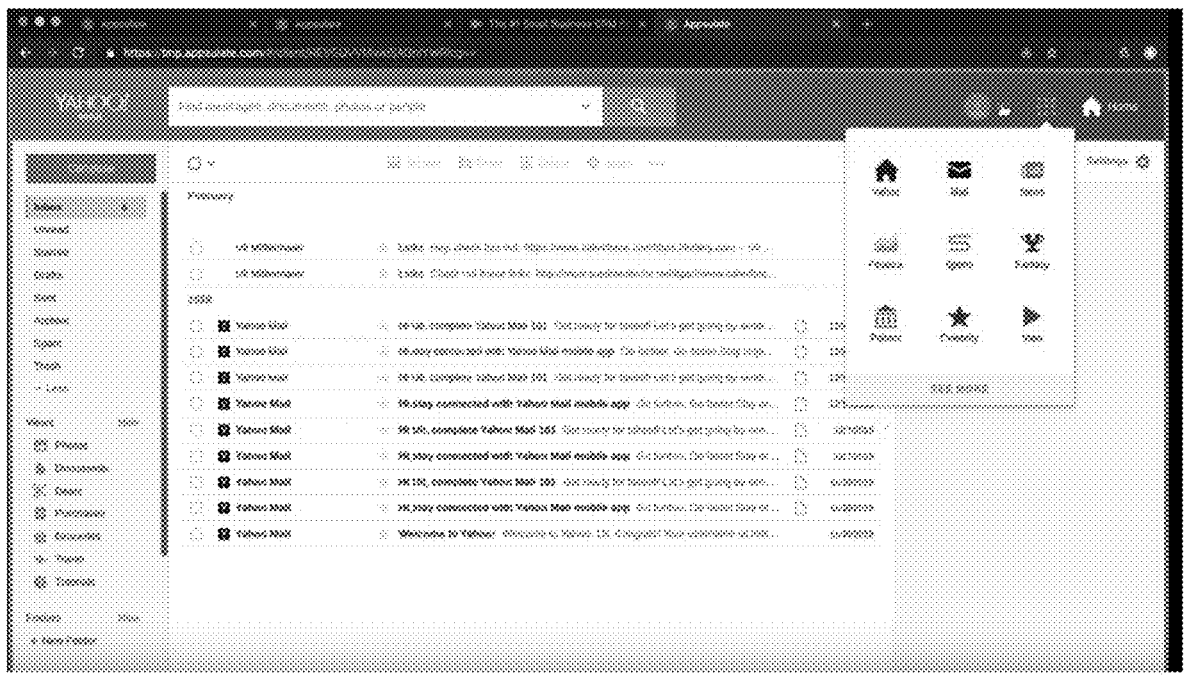
Figure 12H:
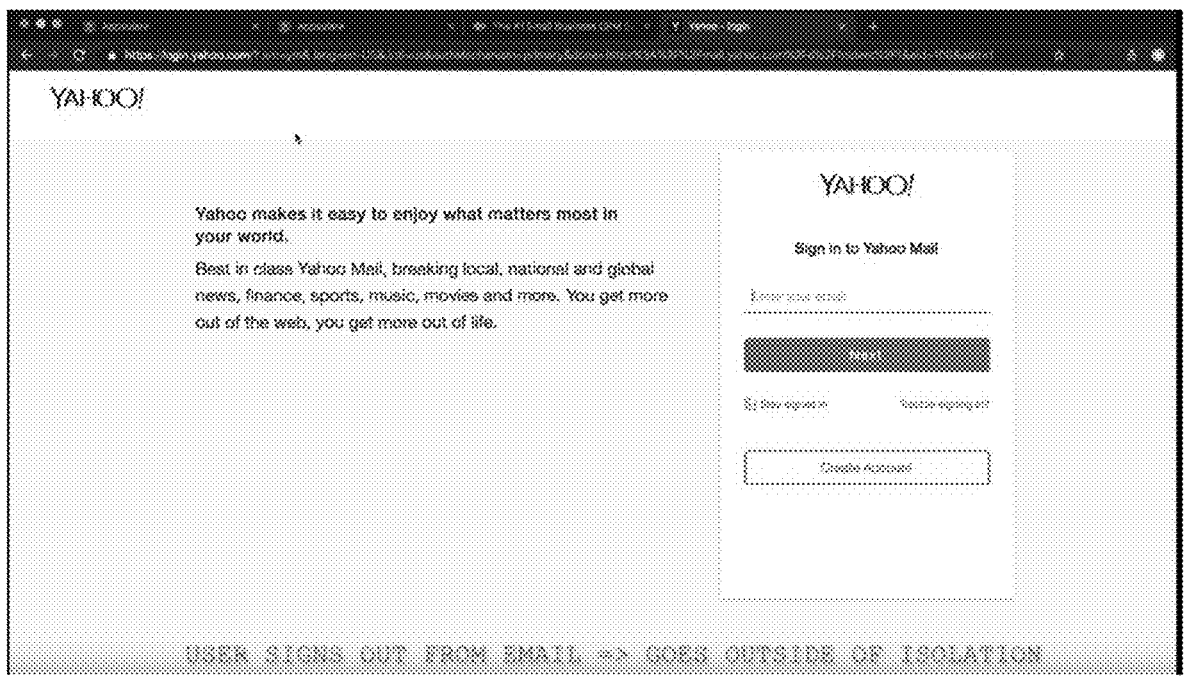

The first tab remains in isolation with the mail page. That is the screenshots of FIGS. 12C, 12D, and 12E show two tabs with the first tab in isolation and the second tab not in isolation. In FIG. 12E, the user clicks on a new link, lottery.com which is opened in a third tab in FIG. 12F in isolation due to policy, e.g., gambling site at work. In FIG. 12G, the user signs out of the mail page and in FIG. 12H, the browser goes outside of isolation.

WebSocket

WebSocket is a protocol, providing full-duplex communication channels over a single Transmission Control Protocol (TCP) connection. The WebSocket protocol was standardized by the IETF as RFC 6455 in 2011, and the WebSocket API in Web IDL is being standardized by the W3C. The present disclosure utilizes the WebSocket protocol for interaction between a web browser (or other client application), such as the native browser 402, and a web server, such as the isolation request service 404. This is made possible by providing a standardized way for the server to send content to the client without being first requested by the client and allowing messages to be passed back and forth while keeping the connection open. Most browsers support the WebSocket protocol, including Google Chrome, Microsoft Edge, Internet Explorer, Firefox, Safari, and Opera. The user device can execute a web browser that loads the image content utilizing a JavaScript application and that interacts with the image content by sending keyboard and mouse inputs via a WebSocket channel So, the native browser 402 only has graphics (pixels) but can interact with the graphics using WebSocket. Further, the present disclosure includes a Javascript layer built on top of a web browser that controls end-user experience (including policies) within the isolated environment.

Process

Figure 13:
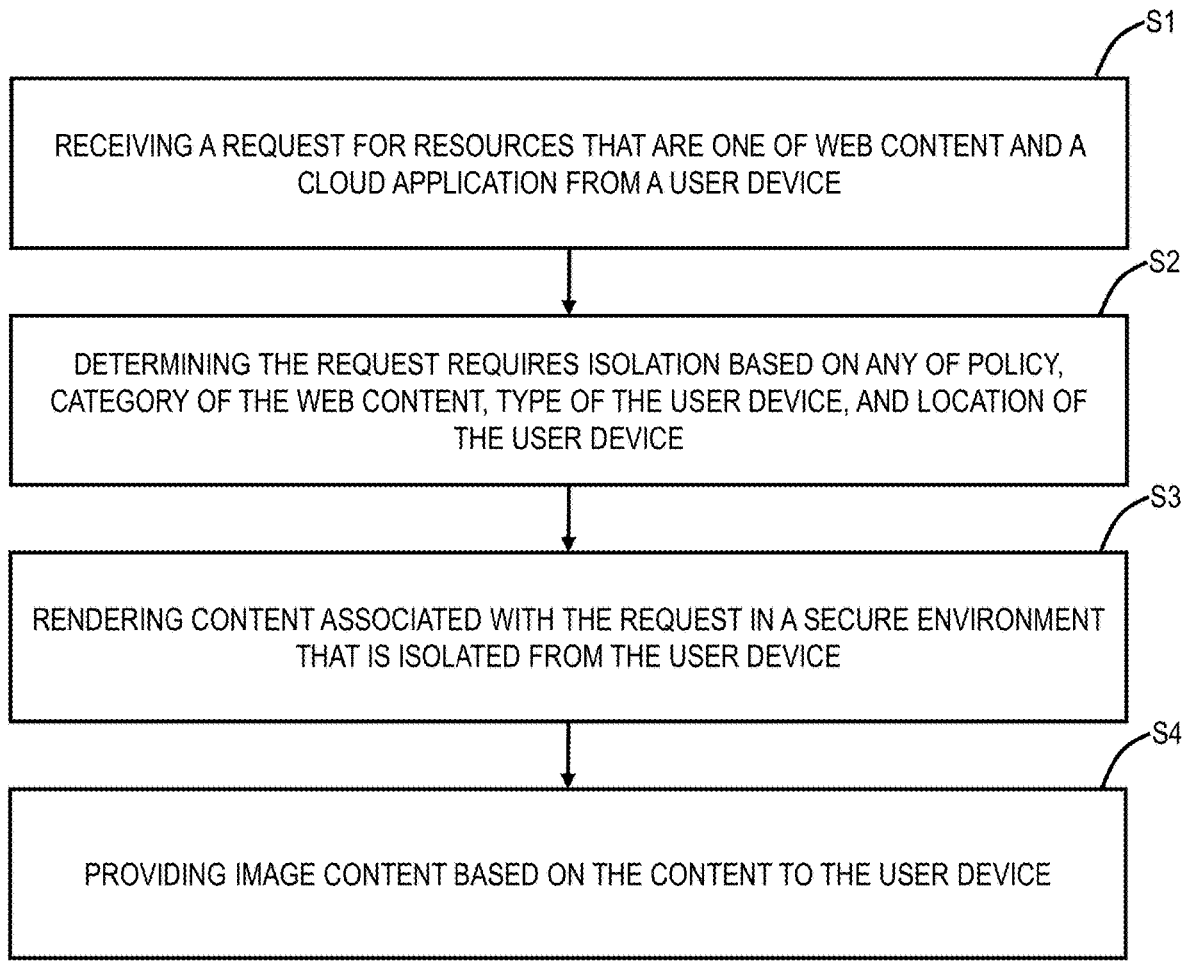
FIG. 13 is a flowchart of a process for web isolation and app gating.

FIG. 13 is a flowchart of a process 1000 for web isolation and app gating. The process 1000 can be a computer-implemented method, implemented as instructions stored in a computer-readable medium and executed by one or more processors, or by an apparatus such as the cloud node 102 or the server 200. The process 1000 includes receiving a request for resources that are one of web content and a cloud application from a user device (step 51); determining the request requires isolation based on any of policy, category of the web content, type of the user device, and location of the user device (step S2); rendering content associated with the request in a secure environment that is isolated from the user device (step S3); and providing image content based on the content to the user device (step S4).

The web content can be based on a URL, and the determination of isolation can be based on a category of the URL such as authorized, unauthorized, or unknown (uncategorized). For example, unauthorized and/or uncategorized URLs can be isolated. The cloud application can be a SaaS application such as Office365, Salesforce, Box, etc. and the determination of isolation can be based on the location, the type of user device, etc. For example, a policy could be to isolate access to the SaaS applications when the user is using an unauthorized device, e.g., outside of the enterprise's control, or when the user is on an open, untrusted network.

The user device can execute a web browser that loads the image content utilizing a JavaScript application, and that interacts with the image content with WebSocket. The resources can be the cloud application and the user device can be one or more of i) located outside an enterprise's network and ii) a non-enterprise device, and the cloud application is provided in isolation to avoid data exfiltration on the user device. The determining can be performed by a secure web gateway.

The process 1000 can further include persisting a state and session of the cloud application in the secure environment, for use after the user device logs out and logs back in. The process 1000 can further include receiving a second request for resources that are one of web content and a cloud application from a user device, wherein the request is a first request; and determining the second request does not require isolation, wherein the first request is rendered in isolation in a first tab of a web browser and the second request is direct, not in isolation, in a second tab of the web browser. The process 1000 can further include, subsequent to a logout or exiting a web browser, for the request, destroying the secure environment. The process 1000 can further include receiving a response to the request in the virtual browser; and converting the response to the image content.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause one or more processors to perform the steps of:
   receiving a request for resources that are one of web content and a cloud application from a user device;
   determining the request requires isolation based on any of policy, category of the web content, type of the user device, and location of the user device, wherein app gating provides the capability to tag/detect endpoint and transparently redirect Software as a Service (SaaS) apps to isolation using a Security Assertion Markup Language (SAML) proxy, wherein the policy is configured to enforce tagging of the user device by generating and sending a cryptographically secure cookie to a native browser of the user device, thereby providing a mechanism to recognize the native browser for the determining;
   in response to the request for resources being from the web content that requires isolation, creating an isolated session by rendering the web content associated with the request in a cloud based secure environment that is isolated from the user device and providing image content to the user device based on the web content rendered, the image content based on the web content rendered being graphics files including passive, safe pixels;

in response to the request for resources being the cloud application that requires isolation, creating an isolated session by isolating the cloud application in the cloud based secure environment and providing image content to the user device based on data from the cloud application, the image content based on the data from the cloud application being graphics files including passive, safe pixels; and taking one or more snapshots at one of regular intervals or before a logout event of a user of cookies and the isolated session created, wherein the snapshots include user-related information and information associated with the isolated session environment, and wherein the snapshots are encrypted and stored for future use.

2. The non-transitory computer-readable medium of claim 1, wherein the user device executes a web browser that loads the image content utilizing a JavaScript application and that interacts with the image content by sending keyboard and mouse inputs via a WebSocket channel.

3. The non-transitory computer-readable medium of claim 1, wherein the resources are the cloud application and the user device is one or more of i) located outside an enterprise's network and ii) a non-enterprise device, and the cloud application is provided in isolation to avoid data exfiltration on the user device.

4. The non-transitory computer-readable medium of claim 1, wherein the determining is performed by a secure web gateway.

5. The non-transitory computer-readable medium of claim 1, wherein the instructions that, when executed, further cause the one or more processors to perform the steps of
fetching and decrypting one or more snapshots from storage; and
persisting or creating a safe and isolated session of the cloud application in the secure environment, for use after the user device logs out and logs back in based on the cookies and isolated session information in the one or more snapshots.

6. The non-transitory computer-readable medium of claim 1, wherein the instructions that, when executed, further cause the one or more processors to perform the steps of
receiving a second request for resources that are one of web content and a cloud application from a user device, wherein the request is a first request;
determining the second request does not require isolation, rendering the first request in isolation in a first tab of a web browser; and
providing access to the second request directly without isolation in a second tab of the same web browser.

7. The non-transitory computer-readable medium of claim 1, wherein the instructions that, when executed, further cause the one or more processors to perform the steps of
subsequent to a logout or exiting a web browser, for the request, destroying the secure environment.

8. The non-transitory computer-readable medium of claim 1, wherein the secure environment is a virtual browser in isolation that performs the request, and wherein the instructions that, when executed, further cause the one or more processors to perform the steps of
receiving a response to the request in the virtual browser; and
converting the response to the image content.

9. An apparatus comprising:
one or more processors; and
memory storing instructions that, when executed, cause the one or more processors to
receive a request for resources that are one of web content and a cloud application from a user device;
determine the request requires isolation based on any of policy, category of the web content, type of the user device, and location of the user device, wherein app gating provides the capability to tag/detect endpoint and transparently redirect Software as a Service (SaaS) apps to isolation using a Security Assertion Markup Language (SAML) proxy, wherein the policy is configured to enforce tagging of the user device by generating and sending a cryptographically secure cookie to a native browser of the user device, thereby providing a mechanism to recognize the native browser for the determining;
in response to the request for resources being from the web content that requires isolation, creating an isolated session by rendering the web content associated with the request in a cloud based secure environment that is isolated from the user device and providing image content to the user device based on the web content rendered, the image content based on the web content rendered being graphics files including passive, safe pixels;
in response to the request for resources being the cloud application that requires isolation, creating an isolated session by isolating the cloud application in the cloud based secure environment and providing image content to the user device based on data from the cloud application, the image content based on the data from the cloud application being graphics files including passive, safe pixels; and
take one or more snapshots at one of regular intervals or before a logout event of a user of cookies and the isolated session created, wherein the snapshots include user-related information and information associated with the isolated session environment, and wherein the snapshots are encrypted and stored for future use.

10. The apparatus of claim 9, wherein the user device executes a web browser that loads the image content utilizing a JavaScript application and that interacts with the image content by sending keyboard and mouse inputs via a WebSocket channel.

11. The apparatus of claim 9, wherein the resources are the cloud application and the user device is one or more of i) located outside an enterprise's network and ii) a non-enterprise device, and the cloud application is provided in isolation to avoid data exfiltration on the user device.

12. The apparatus of claim 9, wherein the apparatus is a secure web gateway.

13. The apparatus of claim 9, wherein the instructions that, when executed, further cause the one or more processors to
fetch and decrypt one or more snapshots from storage; and
persist or create a safe and isolated session of the cloud application in the secure environment, for use after the user device logs out and logs back in based on the cookies and isolated session information in the one or more snapshots.

14. The apparatus of claim 9, wherein the instructions that, when executed, further cause the one or more processors to receive a second request for resources that are one of web content and a cloud application from a user device, wherein the request is a first request;
determine the second request does not require isolation;
render the first request in isolation in a first tab of a web browser; and
provide access to the second request directly without isolation in a second tab of the same web browser.

15. The apparatus of claim 9, wherein the instructions that, when executed, further cause the one or more processors to
subsequent to a logout or exiting a web browser, for the request, destroy the secure environment.

16. The apparatus of claim 9, wherein the secure environment is a virtual browser in isolation that performs the request, and wherein the instructions that, when executed, further cause the one or more processors to
receive a response to the request in the virtual browser; and
convert the response to the image content.

17. A method comprising:
receiving a request for resources that are one of web content and a cloud application from a user device;
determining the request requires isolation based on any of policy, category of the web content, type of the user device, and location of the user device, wherein app gating provides the capability to tag/detect endpoint and transparently redirect Software as a Service (SaaS) apps to isolation using a Security Assertion Markup Language (SAML) proxy, wherein the policy is configured to enforce lagging of the user device by generating and sending a cryptographically secure cookie to a native browser of the user device, thereby providing a mechanism to recognize the native browser for the determining;
in response to the request for resources being from the web content that requires isolation, creating an isolated session by rendering the web content associated with the request in a cloud based secure environment that is isolated from the user device and providing image content to the user device based on the web content rendered, the image content based on the web content rendered being graphics files including passive, safe pixels;
in response to the request for resources being the cloud application that requires isolation, creating an isolated session by isolating the cloud application in the cloud based secure environment and providing image content to the user device based on data from the cloud application, the image content based on the data from the cloud application being graphics files including passive, safe pixels; and
taking one or more snapshots at one of regular intervals or before a logout event of a user of cookies and the isolated session created, wherein the snapshots include user-related information and information associated with the isolated session environment, and wherein the snapshots are encrypted and stored for future use.

18. The method of claim 17, wherein the user device executes a web browser that loads the image content utilizing a JavaScript application and that interacts with the image content by sending keyboard and mouse inputs via a WebSocket channel.

19. The method of claim 17, wherein the resources are the cloud application and the user device is one or more of i) located outside an enterprise's network and ii) a non-enterprise device, and the cloud application is provided in isolation to avoid data exfiltration on the user device.

20. The method of claim 17, further comprising
receiving a second request for resources that are one of web content and a cloud application from a user device, wherein the request is a first request;
determining the second request does not require isolation;
rendering the first request in isolation in a first tab of a web browser, and
providing access to the second request directly without isolation in a second tab of the same web browser.

\* \* \* \* \*